(12) United States Patent
Woo et al.

(10) Patent No.: US 9,354,788 B2
(45) Date of Patent: May 31, 2016

(54) MOBILE TERMINAL AND CONTROL METHOD THEREOF

(71) Applicant: LG ELECTRONICS INC., Seoul (KR)

(72) Inventors: Seunghyun Woo, Seoul (KR); Hayang Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 13/898,425

(22) Filed: May 20, 2013

(65) Prior Publication Data

US 2013/0326340 A1    Dec. 5, 2013

(30) Foreign Application Priority Data

Jun. 1, 2012    (KR) .................. 10-2012-0059401

(51) Int. Cl.
*G06F 3/0484* (2013.01)
*G06F 3/0488* (2013.01)
*H04M 1/725* (2006.01)

(52) U.S. Cl.
CPC ............ *G06F 3/0484* (2013.01); *G06F 3/0488* (2013.01); *H04M 1/72522* (2013.01); *H04M 1/72583* (2013.01); *H04M 2250/22* (2013.01)

(58) Field of Classification Search
CPC .................................................. G06F 3/04815
See application file for complete search history.

(56) References Cited

U.S. PATENT DOCUMENTS

| | | | |
|---|---|---|---|
| 2005/0210401 A1* | 9/2005 | Ketola et al. .................. | 715/770 |
| 2010/0070899 A1* | 3/2010 | Hunt et al. .................... | 715/769 |
| 2011/0007029 A1* | 1/2011 | Ben-David .................... | 345/174 |
| 2011/0099507 A1* | 4/2011 | Nesladek et al. ............. | 715/780 |
| 2012/0158472 A1* | 6/2012 | Singh et al. .................. | 705/14.4 |
| 2013/0067408 A1* | 3/2013 | Markiewicz .......... | G06F 3/0481 715/825 |
| 2013/0222363 A1* | 8/2013 | Chu et al. ..................... | 345/419 |

* cited by examiner

*Primary Examiner* — Asher Kells
(74) *Attorney, Agent, or Firm* — Lee, Hong, Degerman, Kang & Waimey; Jonathan Kang; Harry Lee

(57) ABSTRACT

This specification related to a mobile terminal and a control method thereof. The mobile terminal includes a display unit to output an electronic document page including at least one object, and a controller to select one area on the page in response to a touch input applied onto the display unit, and control the display unit to display the selected one area in a distinguishing manner from the page.

9 Claims, 32 Drawing Sheets

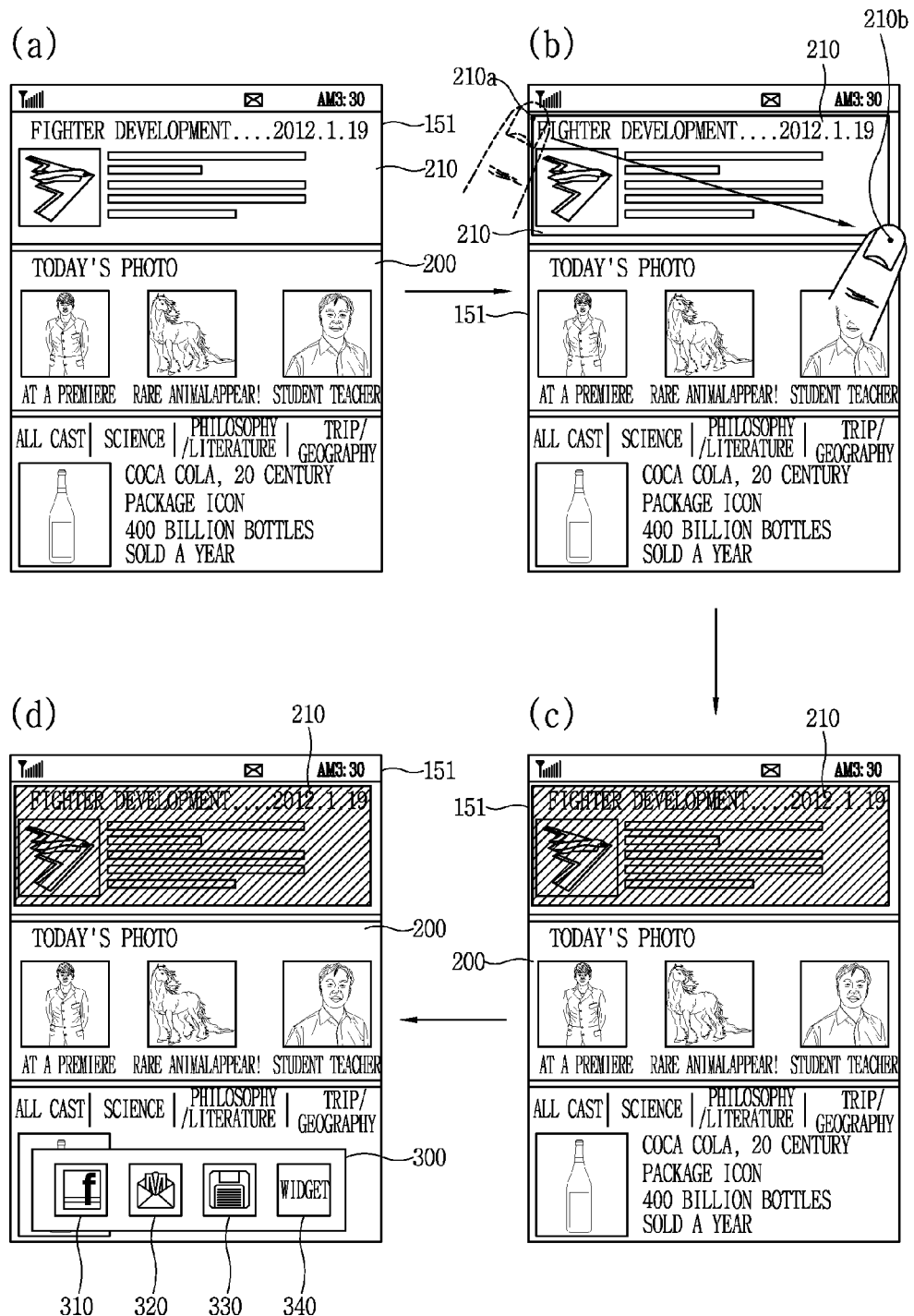

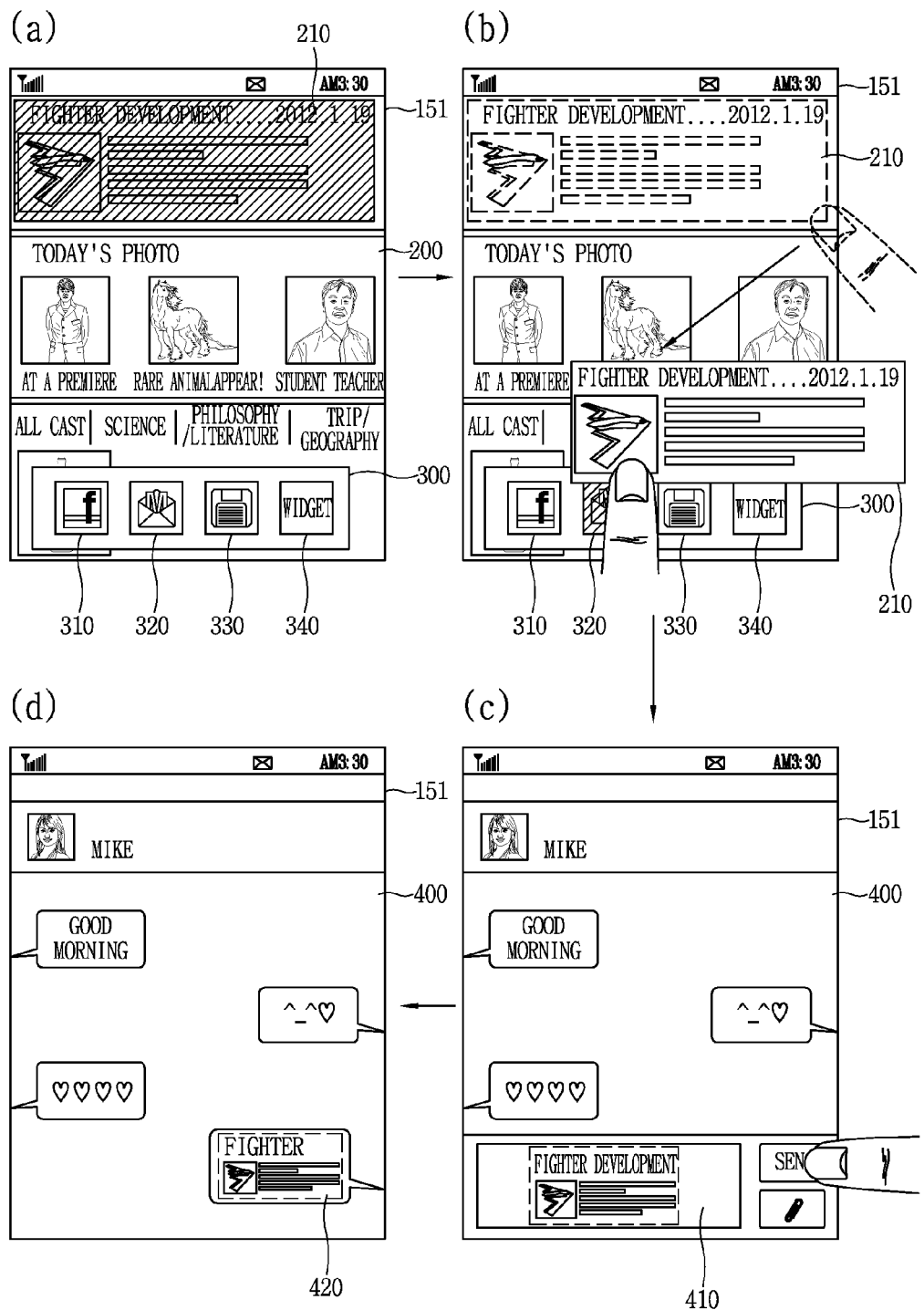

FIG. 9A
(a)
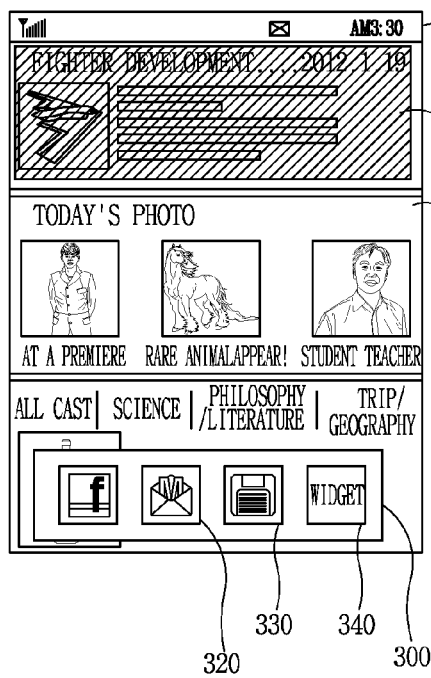
(b)
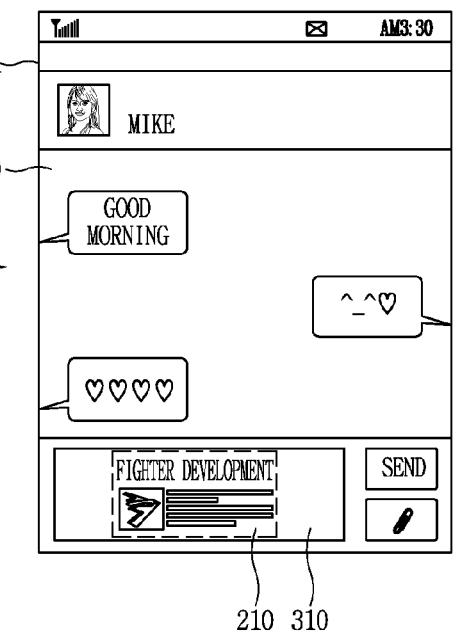
(c)
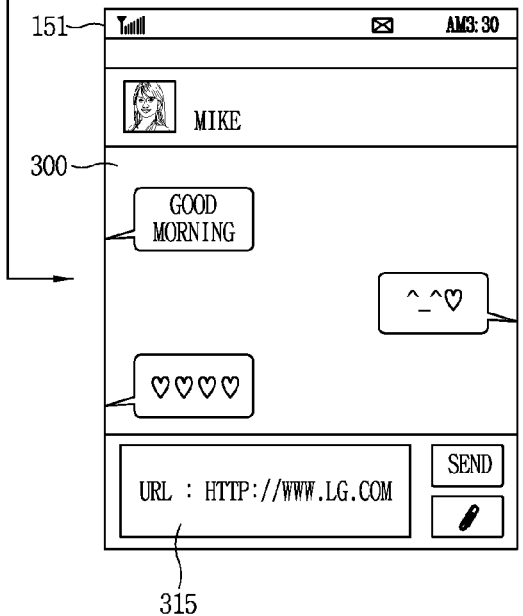

FIG. 10B
(a) 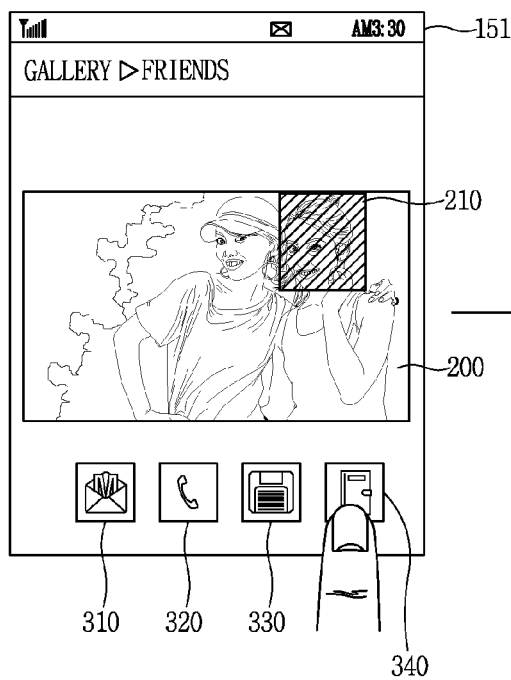
(b) 

FIG. 10C
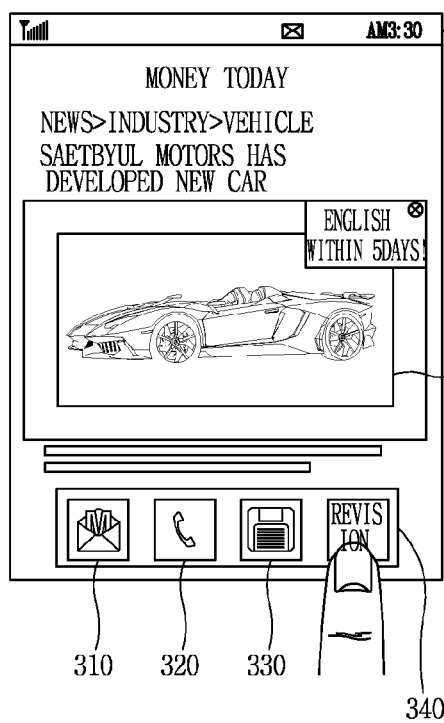
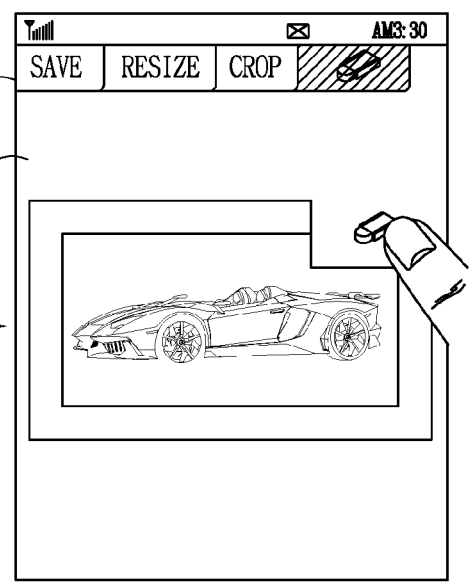

FIG. 12B
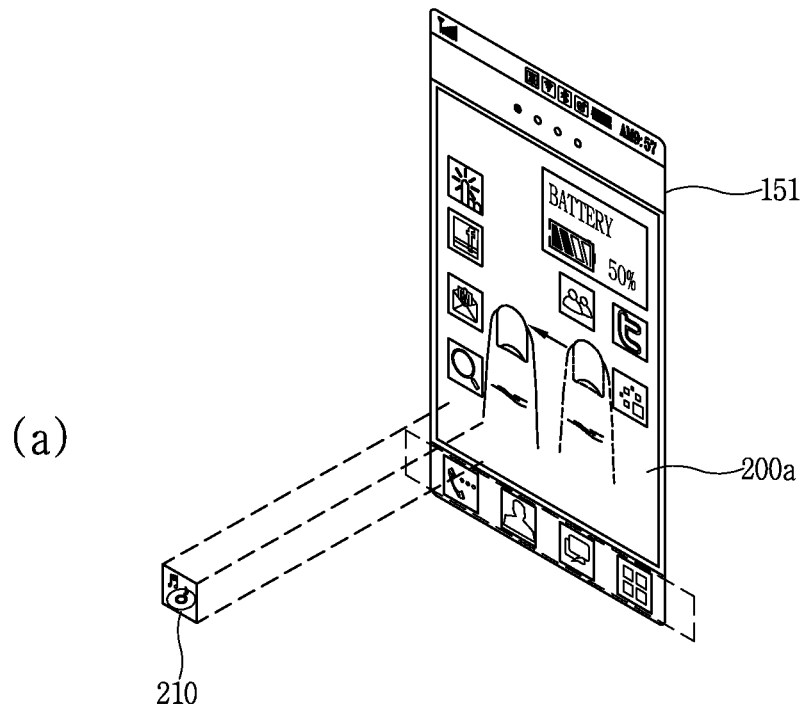
(a)
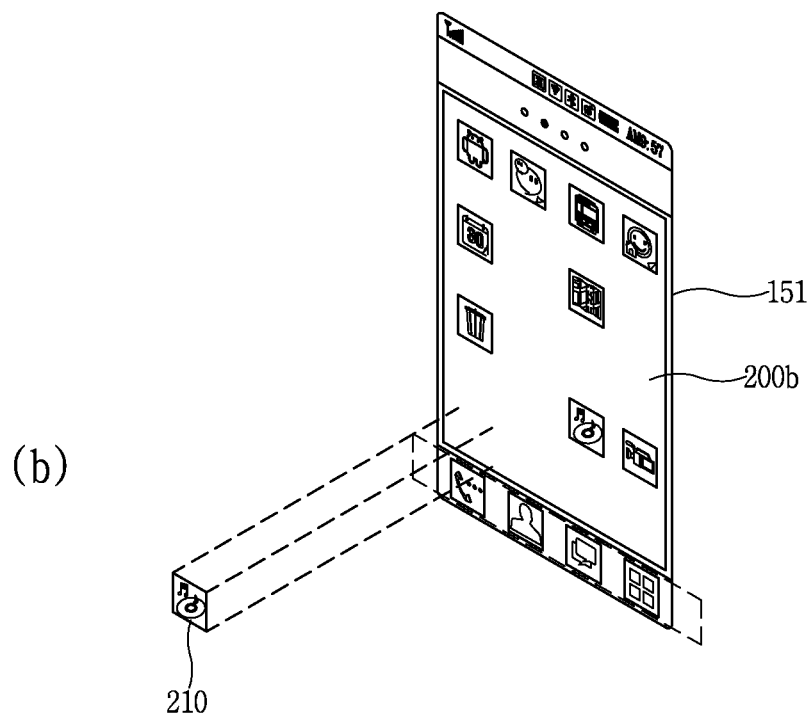
(b)

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2012-0059401, filed on Jun. 1, 2012, the contents of which is incorporated by reference herein in its entirety.

BACKGROUND OF THE INVENTION

1. Field of the Invention

This specification relates to a mobile terminal which is sensitive to touch, and a control method thereof.

2. Background of the Invention

Terminals may be divided into mobile/portable terminals and stationary terminals according to their mobility. Also, the mobile terminals may be categorized into a handheld terminal and a vehicle mount terminal according to whether it is directly portable by a user.

As it becomes multifunctional, the mobile terminal can be allowed to capture still images or moving images, play music or video files, play games, receive broadcast and the like, so as to be implemented as a multimedia player.

Various new attempts have been made for the multimedia devices by hardware or software in order to implement such complicated functions.

Also, icons associated with applications may be output on a display of the mobile terminal. The output icons may be arranged on different positions according to user preferences.

SUMMARY OF THE INVENTION

Therefore, an aspect of the detailed description is to provide a mobile terminal capable of changing a position of an icon or widget corresponding to an application through a simple manipulation by use of a touch input with respect to a base area including the icon or widget.

To achieve these and other advantages and in accordance with the purpose of this specification, as embodied and broadly described herein, there is provided a mobile terminal including a display unit to output an electronic document page including at least one object, and a controller to select one area on the page in response to a touch input applied onto the display unit, and control the display unit to display the selected one area in a distinguishing manner from the page.

In one aspect of the present invention, the controller may change attribute information related to a visual appearance of at least one of the one area and the other area of the page except for the one area, so as to identify the selection of the one area.

In one aspect of the present invention, the controller may control a three-dimensional (3D) depth value of the one area so that the one area is displayed in form of a three-dimensional stereoscopic image.

In one aspect of the present invention, when the one area is in plurality, the controller may control the display unit so that the plurality of one areas have different three-dimensional depth values based on a preset display condition.

In one aspect of the present invention, the controller may identify at least one object included within the one area, and determine at least one function executable using the identified object.

In one aspect of the present invention, the controller may convert the page into an execution screen corresponding to one of the determined at least one function, in response to a touch input, which is different from the touch input for selecting the one area.

In one aspect of the present invention, the at least one object included in the one area may be continuously output on the display unit even though the page output on the display unit is converted into the execution screen.

In one aspect of the present invention, in response to a touch input applied onto the display unit by a preset method in the state the execution screen corresponding to the one function is displayed, the execution screen corresponding to the one function, output on the display unit, may be converted into an execution screen corresponding to another function, different from the one function, of the at least one function.

In one aspect of the present invention, the controller may control the display unit to output at least one function icon corresponding to each of the determined at least one function.

In one aspect of the present invention, when an object included within the one area is dragged to one of the at least one function icon, a function corresponding to the one function icon may be executed in association with the object.

In one aspect of the present invention, when at least three points on the display unit are touched by a user, an area formed by the at least three points may be selected as the one area.

In one aspect of the present invention, the controller may display the user-touched points and a virtual area likely to be formed by the touch inputs in a highlighting manner, such that the user can identify those points and the virtual area.

In one aspect of the present invention, the controller may copy and save the at least one object included within the one area based on a user selection. Also, the controller may copy and save the at least one object by different methods according to a type of object included within the one area.

In one aspect of the present invention, the controller may copy and save the object, the object may be implemented as one of image, text, video and flash, and the controller may copy and save a thumbnail image of a video and a URL address corresponding to the video when the object is the video.

In accordance with one exemplary embodiment of the present invention, there is provided a mobile terminal including a display unit to display a first home screen page including at least one object, and a controller. The controller may be configured to execute an edit mode for changing position information related to one of the at least one object in response to a first touch input applied to the one object, convert the first home screen page into a second home screen page, different from the first home screen page, in response to a second touch input applied onto the display unit, and arrange the one object on the first or second home screen page based on a user selection.

In one aspect of the present invention, the controller may control a three-dimensional depth value of the one object such that the one object is three-dimensionally displayed, and the one object may be continuously output on the display unit even though the first home screen page is converted into the second home screen page.

In one aspect of the present invention, the display unit may output both the first or second home screen page and a first or second object group consisting of objects included in the first or second home screen page, the controller may control the first or second home screen page and the first or second object group to have different three-dimensional depth values. Here, the three-dimensional depth value of the one object may be different from the depth values of the first or second home screen page and the first and second object group.

In one aspect of the present invention, the controller may control the objects included in the first or second group to have different three-dimensional depth value according to association with the one object.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 4 is an overview showing the control method of the mobile terminal shown in FIG. 3;

FIGS. 6A to 6C and FIGS. 7A to 7D are overviews showing a method of displaying functions associated with a selected one area in the mobile terminal;

FIGS. 9A and 9B are overviews showing a method of extracting information included in one area in the mobile terminal;

FIGS. 10A to 10C are overviews showing functions associated with a selected one area in the mobile terminal;

FIGS. 12A and 12B are overviews showing a method of moving a selected object and a home screen page in the mobile terminal.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described in this specification may include cellular phones, smart phones, laptop computers, digital broadcasting terminals, personal digital assistants (PDAs), portable multimedia players (PMPs), navigators, and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
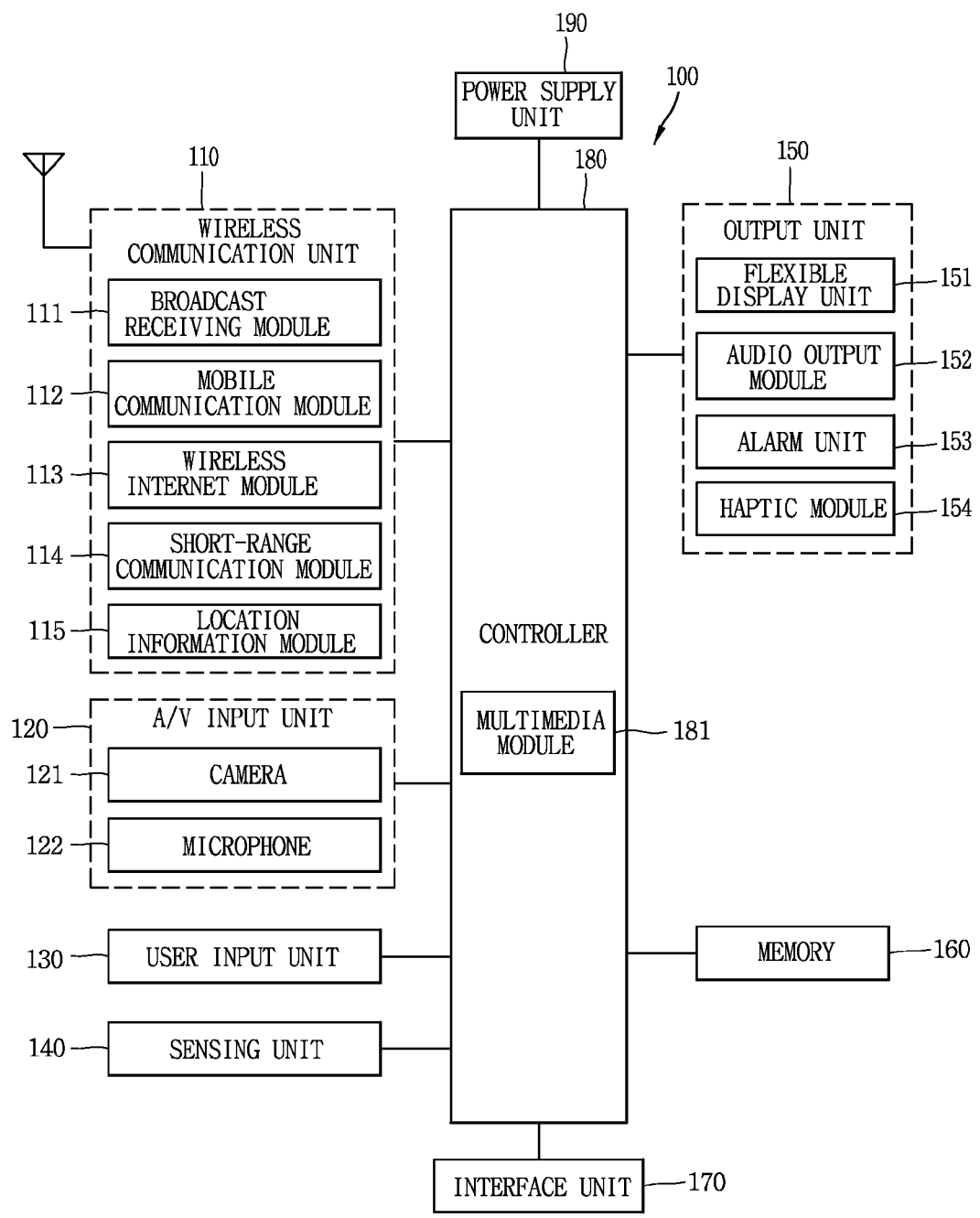
FIG. 1 is a block diagram of a mobile terminal in accordance with one exemplary embodiment.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or Wireless Fidelity (WiFi) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device.

The sensing unit 140 may include a proximity sensor, a three-dimensional (3D) touch sensing portion, a supersonic wave sensing portion and a camera sensing portion. The sensing unit 140 may also be implemented as a 3D sensor capable of detecting a position of a target (hereinafter, referred to as 'sensing target') moving within a 3D space. Here, the sensing target may be a part of a user's body (finger), an accessory device or the like, for example.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area by a touch object, but also touch pressure. Here, the touch object is an object to apply a touch to the touch sensor, for example, a finger, a touch pen or a stylus pen, a pointer and the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device')

may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Also, the controller 180 may execute a lock state, in which a user is restricted from inputting a control command for applications, when a state of the mobile terminal satisfies a preset condition. The controller 180 may control a lock screen, which is displayed in the lock state, based upon a touch input detected on the display unit 151 (hereinafter, referred to 'touch screen') in the lock state.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of components provided in the mobile terminal in accordance with the exemplary embodiment shown in FIG. 1.

Figure 2A:
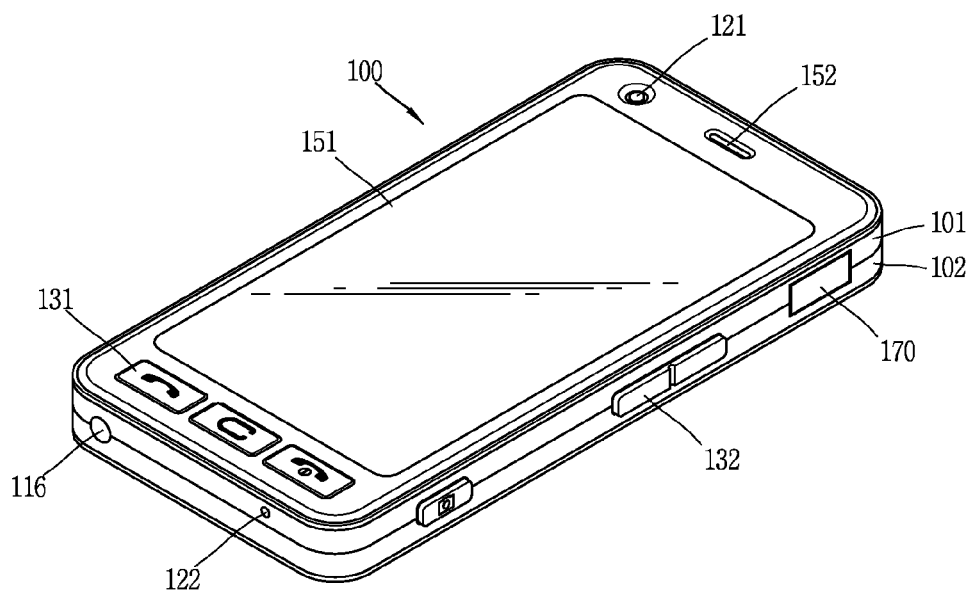
FIGS. 2A and 2B are front perspective views of the mobile terminal shown in FIG. 1.
Figure 2B:
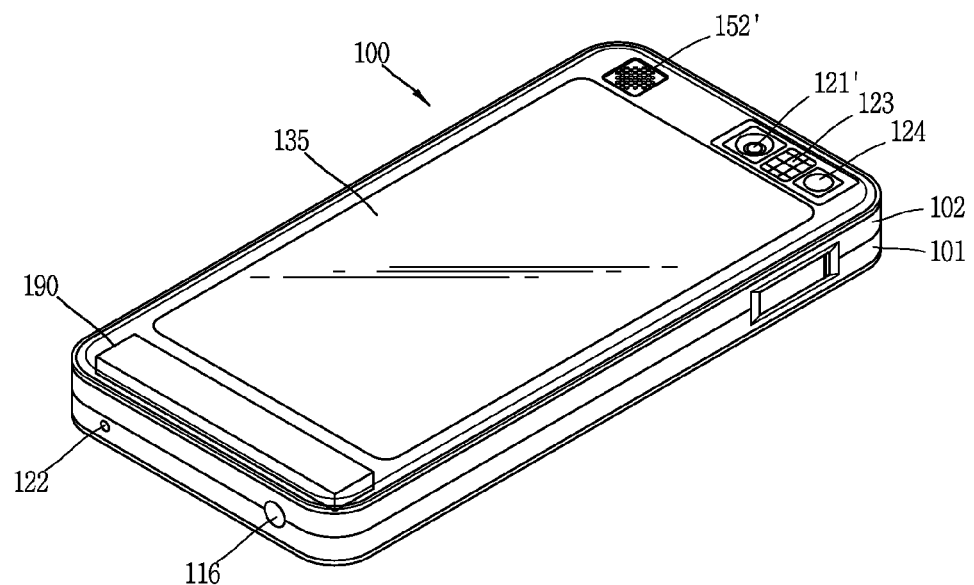

FIG. 2A is a front perspective view showing an example of the mobile terminal, and FIG. 2B is a rear perspective of the mobile terminal of FIG. 2A.

The mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

As shown in FIGS. 2A and 2B, a terminal main body (hereinafter, referred to as 'body') 100 may include a front surface, side surfaces and a rear surface. Also, the body may have both ends formed in a lengthwise direction.

A body may include a case (or referred to as casing, housing, cover, etc.) defining an appearance of the mobile terminal 100. In this exemplary embodiment, the case may be divided into a front case 101 and a rear case 102. A space formed between the front and rear cases 101 and 102 may accommodate various electronic components. At least one intermediate case may further be disposed between the front and the rear cases 101 and 102.

Such cases may be injected using a synthetic resin or be formed of a metal, such as stainless steel (STS), titanium (Ti) or the like.

The front case 101 is usually shown having a display unit 151, an audio output module 152, a camera 121, a user input unit 130/131, 132, a microphone 122, an interface unit 170, and the like.

The display unit 151 may occupy most of a principal surface of the front case 101. The audio output module 152 and the camera 121 may be disposed near one of both end portions of the display unit 151, and the user input unit 131 and the microphone 122 on the other end portion of the display unit 151. The user input unit 131, the interface unit 170 and the like may be disposed on side surfaces of the front and rear cases 101 and 102. The microphone 122 may be disposed on the other end of the body 100.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display module 210 into a touch recognition mode, or the like.

Referring to FIG. 2B, an audio output module 152' may further be disposed at a rear face of the terminal body, namely, the rear case 102. The audio output module 152' can cooperate with the audio output module 152 (see FIG. 2A) to provide stereo output. Also, the audio output module 152' may be configured to operate as a speakerphone.

The rear case 102 of the terminal body may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display module, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

The touchpad 135 may operate mutually in association with the display unit 151 of the front case 101. The touchpad 135 may be provided on the rear of the display unit 151 in parallel to each other. The touchpad 135 may have a size the same as or smaller than the size of the display unit 151.

Also, a mobile terminal in accordance with one exemplary embodiment having at least one of those components may be configured to search for functions associated with information included in one area when the one area is selected by a user from an electronic document page, which is output on the display unit. In addition, the searched functions may be output on the display unit together with the selected area, thereby reducing a user's burden of searching for those functions associated with the selected area for performing them.

Figure 3:
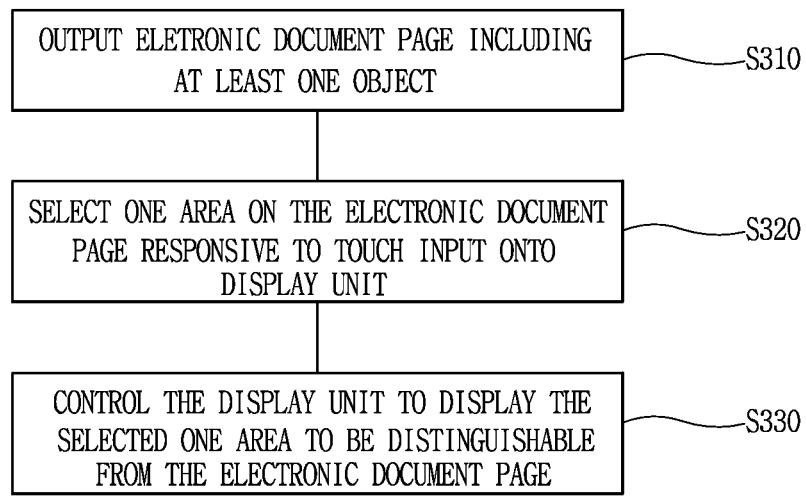
FIG. 3 is a flowchart showing a method of displaying one area in a distinguishing manner from the other area of an electronic document page when the one area is selected from the electronic document page in a mobile terminal in accordance with one exemplary embodiment.

Hereinafter, description will be given in more detail of a method of selecting one area on an electronic document page and performing functions associated with the selected one area, with reference to the accompanying drawings. FIG. 3 is a flowchart showing a method of displaying one area in a distinguishing manner from the other area of an electronic document page when the one area is selected from the electronic document page in a mobile terminal in accordance with one exemplary embodiment, and FIG. 4 is an overview showing the control method of the mobile terminal shown in FIG. 3.

In the mobile terminal according to the present invention, the controller 180 may control the display unit 151 to output an electronic document page which includes at least one object (S310).

Here, the electronic document page may refer to a webpage, an e-book screen, an application execution screen and a home screen page, and indicate all kinds of screens which can be output on the display unit 151.

As one example, the electronic document page, as shown in FIG. 4-(a), may be a webpage screen related to news.

The object included in the electronic document page may be used to provide information to a user on the electronic document page. The object may be one of an image, text, a video and a flash. The electronic document page may include at least one of those objects.

In the meantime, with the electronic document page 200 (see FIG. 4-(a)) being output on the display unit 151, when a touch input is applied onto the display unit 151, the controller 180 may select one area from the electronic document page in response to the touch input (S320).

Here, the touch input for selecting the one area of the electronic document page may be a touch input having a preset type of touch pattern. (The touch input for selecting the one area will be described in detail in relation to FIGS. 8A to 8C to be explained later.

Meanwhile, the controller 180 may select one area in response to a touch input only when a specific mode (for example, an edit mode) is executed, and the specific mode may be executed based on a user selection. Also, the selection of the specific mode may be executed by use of a random icon output on the display unit or through a mode selection on an environment settings menu.

As shown in the step S320, upon the selection of the one area, the controller 180 may control the display unit 151 to display the selected one area in a distinguishing manner from the other area of the electronic document page (S330).

For example, as shown in FIG. 4-(b), when one area 210 is selected by a drag touch input (210a→210b) output on the display unit 151, the controller 180 may display the selected (one) area 210 to be distinguished from the other area of an electronic document page 200, so that the user can identify the selected area 210.

Here, the method of displaying the selected one area 210 in the distinguishing manner may be implemented by various ways of, for example, enlarging, reducing, changing a color of, flickering, changing transparency of, highlighting, shading, changing into 3D stereophonic image the selected one area 210. The method of displaying a specific area to be distinguishable from the other area may be referred to as 'highlighting' the specific area.

Thus, the controller 180 may change attribute information related to a visual appearance of at least one of the selected one area 210 and the other area of the electronic document page 200 except for the one area 210 so that the user can identify the selected one area 210.

When the one area is selected from the electronic document page 200, the controller 180 may search for at least one function which may be executable in association with the selected one area.

That is, the controller 180 may identify at least one object included in the selected one area, and determine at least one function capable of using the identified object.

For example, referring to FIG. 4, the controller 180, as shown in FIG. 4-(d), may control the display unit 151 to display function icons 310, 320, 330, 340 corresponding to at least one function, which is executable in association with the object (image or text object) included in the selected one area 210.

As described above, the mobile terminal may be configured to display one area selected by a user to be distinguishable from the other area, and search for functions associated with the selected one area, resulting in reducing a user's burden of separately searching for applications for executing the functions associated with objects included in the one area selected by the user.

Hereinafter, description will be given in more detail of a method of displaying a selected one area using a 3D image when the one area is selected from an electronic document page in response to a touch input, with reference to the accompanying drawings. FIGS. 5A to 5D are overviews showing a method of displaying a selected one area in the mobile terminal in a distinguishing manner.

Description has been given of the method of displaying the selected one area of the electronic document page in the highlighting manner so as to be distinguishable from the other area. The controller 180 may convert the selected one area into a 3D stereophonic image and display the 3D image, thereby displaying the selected one area to be distinguishable from the other area on the electronic document page.

Figure 5A:
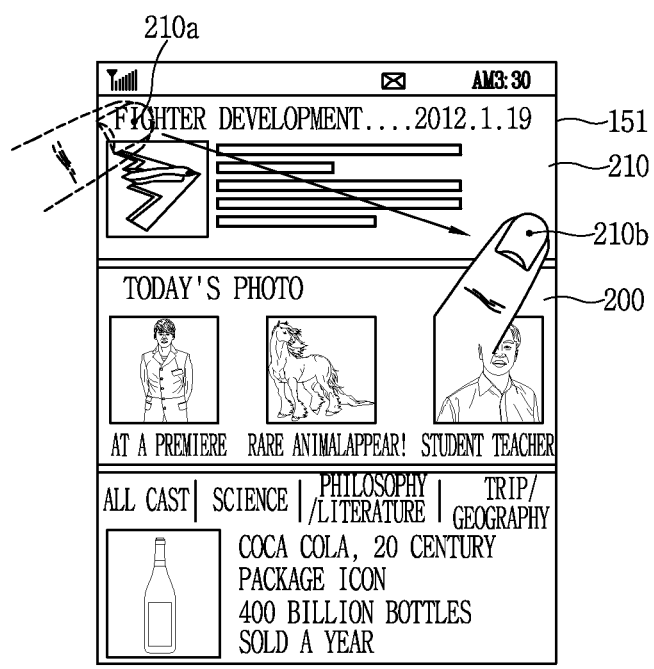
FIGS. 5A to 5D are overviews showing a method of displaying a selected one area in a distinguishing manner in the mobile terminal.
Figure 5B:
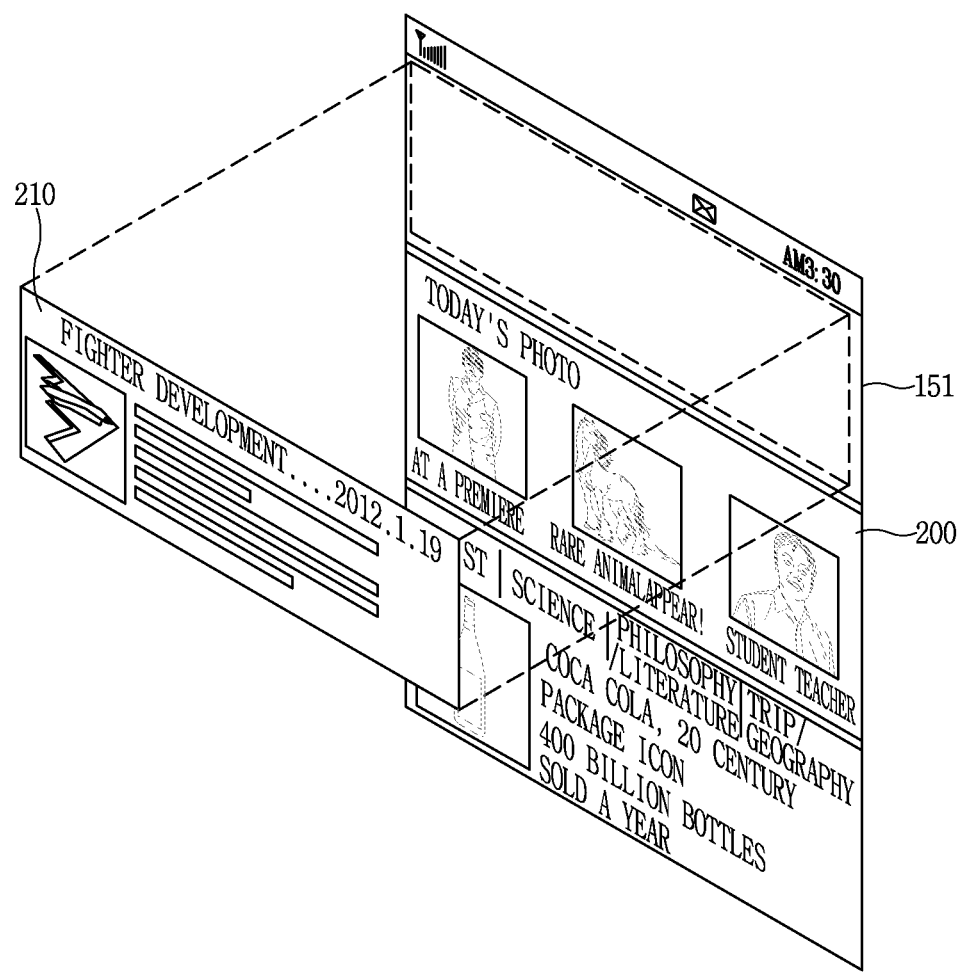

Referring to FIG. 5A, when one area is selected in response to a touch input (for example, a drag touch input corresponding to a direction from 210a to 210b) applied onto the display unit 151, the controller 180 may display the selected one area 210 in the form of a 3D image, as shown in FIG. 5B, by controlling a 3D depth value of the selected one area.

In the meantime, the display unit 151 which outputs the 3D image may be implemented as a display unit capable of displaying a stereophonic image. Here, the stereophonic image may indicate a 3D stereoscopic image, and the 3D stereoscopic image may be an image in which a space where an object is located on a monitor or a screen is given gradual depth and reality so as to be felt like a real space.

The 3D stereoscopic image may be realized using a binocular disparity. Here, the binocular disparity refers to disparity generated due to positions of two eyes which are apart from each other by about 65 mm. When the two eyes view different 2D (two-dimension) images, the two 2D images are transferred to a brain via the retina, and the brain combines the two 2D images. Accordingly, the combined image may acquire depth and reality of a stereoscopic image.

In this specification, the term "depth value" may refer to an index indicating a distance difference between objects included in a 3D image. In more detail, when an object output on the display unit 151 is viewed in a 2D form, a depth value of the object may be defined as "0". However, a depth value of an object, which looks like a 3D form as if protruding to the outside of the mobile terminal 100 based on a screen of the display unit 151, may be defined as a negative number. On the contrary, a depth value of an object which looks like being sunk (recessed) into the mobile terminal 100 may be defined as a positive number. In addition, an absolute value of the depth value of the object may increase when a position of looking at the object included in the 3D image in the externally protruding form is at a close range, whereas the depth value of the object may increase when a position of looking at the object included in the 3D image in the internally recessed form is at a long range.

Hereinafter, for the sake of brief description, when a position of looking at an object included in a 3D image is at a short range, it may be represented as "a depth value of the object is great". When being at a long range, it may be represented as "a depth value of the object is small."

The 3D depth value of the selected one area shown in FIG. 5B may be controlled by a user selection or settings of the controller.

Figure 5C:
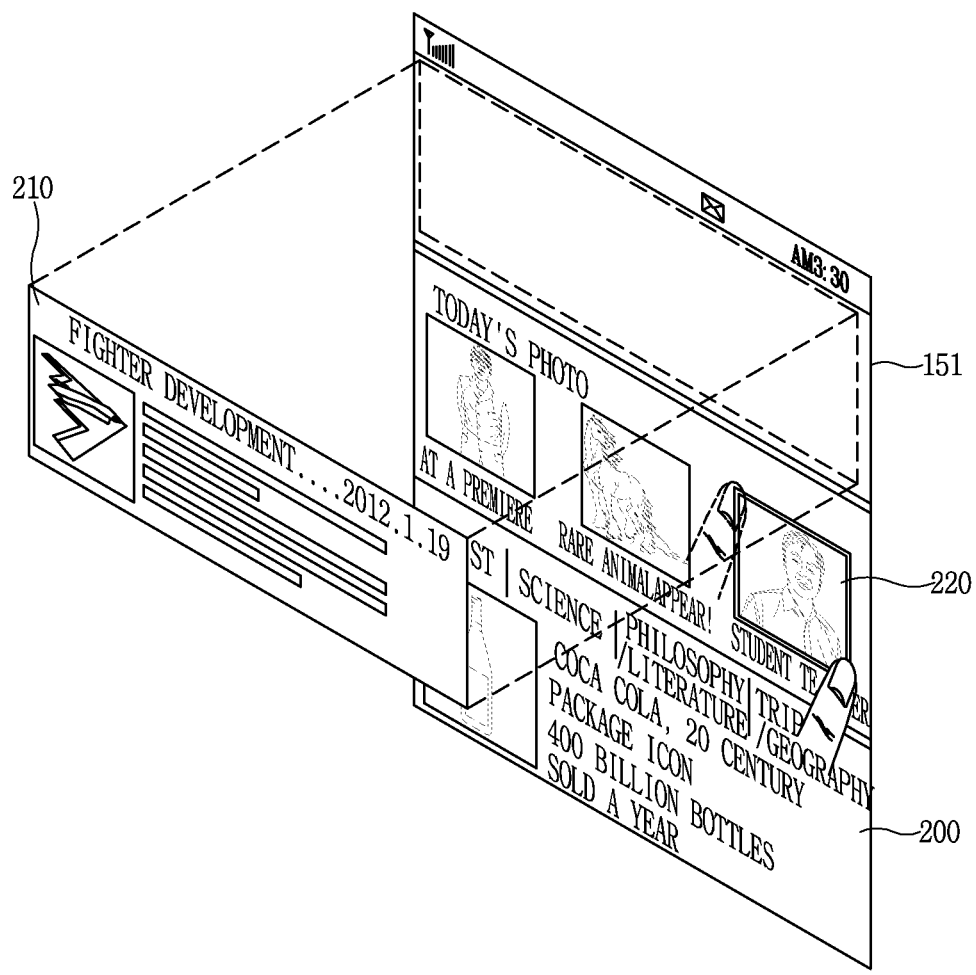
Figure 5D:
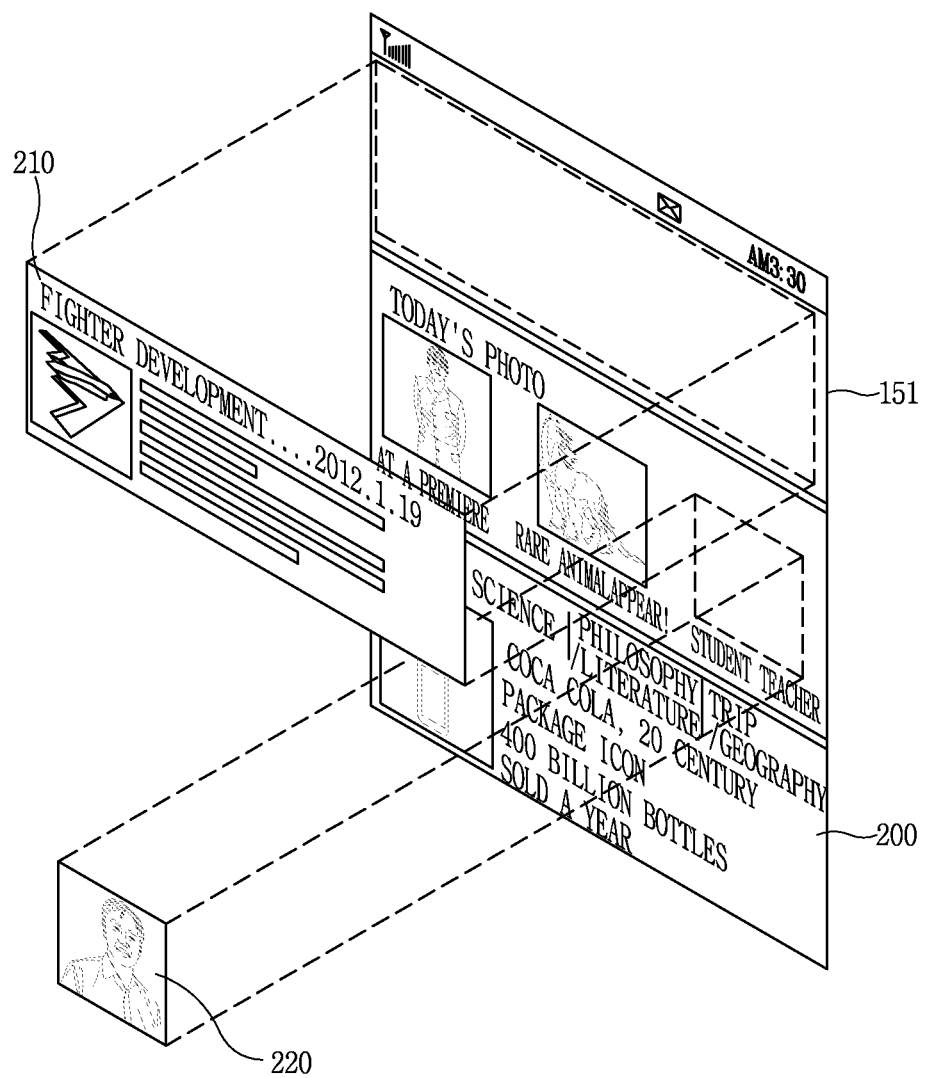

Referring to FIG. 5B, in the state that the selected one area is stereoscopically displayed with a 3D depth value other than '0', when another area 220 is selected on the electronic document page 200 as shown in FIG. 5C, then the controller 180 may control the display unit 151 to display both the one area 210 and the another area 220 in the form of the 3D stereoscopic image.

Also, in this case, the controller 180 may control the display unit 151 such that the first selected area 210 and the later selected area 220 have different 3D depth values from each other. The controller 180 may provide a user with intuitive information related to a selection order based on the different 3D depth values. Besides, the controller 180 may also provide priority information, association information and the like related to a plurality of selected areas based on the different 3D depth values.

Also, the controller 180 may control the 3D depth values of the plurality of areas 210 and 220 based on touch inputs onto the plurality of areas 210 and 220. An object included in an area having a greater 3D depth value may be used to execute a function searched by the controller 180.

As described above, the mobile terminal may be configured to display one area, which is selected in response to a user's touch input onto an electronic document page, in form of a 3D stereoscopic image, allowing the user to intuitively recognize where the selected area is located.

Hereinafter, description will be given in more detail of a method of executing associated functions using a selected one area, with reference to the accompanying drawings. FIGS. 6A to 6C and FIGS. 7A to 7D are overviews showing a method of displaying functions associated with a selected one area in the mobile terminal.

As described above with reference to FIGS. 3 and 4, the controller 180 may search for at least one function which is executable in association with an object included in the selected one area 210. The controller 180 may determine an application capable of executing the searched function, and display an icon of the determined application or an execution screen of the determined application on the display unit 151.

Here, the function executable in association with the object included in the selected one area 210 may refer to performing a function selected by a user using the object, such as a function of using the object as additional data, a function of editing the object or a function of saving the object.

For example, as shown in FIG. 6A-(a), when a user selects an area having an article associated with "Fighter Development" on an electronic document page, then the controller 180 may output an icon 310 corresponding to an application (e.g., Facebook), to which an image or 'article' corresponding to the selected area 210 is to be uploaded, on the display unit 151. Also, the controller 180 may output on the display unit 151 an icon 320 corresponding to a message application by which the image or 'article' corresponding to the selected area 210 is transmitted as additional data, an icon 330 corresponding to a memory-related application in which the image or 'article' corresponding to the selected area 210 is saved, or an icon 340 corresponding to a widget function for arranging the image or 'article' corresponding to the selected area 210 on a home screen page, respectively. In addition to those functions, the controller 180 may output icons of applications corresponding to functions, which are executable in association with the selected area, on a random area of the display unit 151.

In the meantime, the controller 180 may extract the one area 210 as an image object by recognizing the area 210 corresponding to the article related to "Fighter Development" as an image, or extract information from the electronic document page 200 such that the 'article' itself in addition to pages linked to the article related to "Fighter Development" can be an object.

Hereinafter, description will be given in more detail of a method of executing functions associated with a selected one area.

As shown in FIG. 6A-(a), the controller 180 may control the display unit 151 to display icons 310, 320, 330, 340 corresponding to each of at least one application, which is allowed to execute functions using the selected one area 210, on a random area 300 of the display unit 151.

Figure 6B:
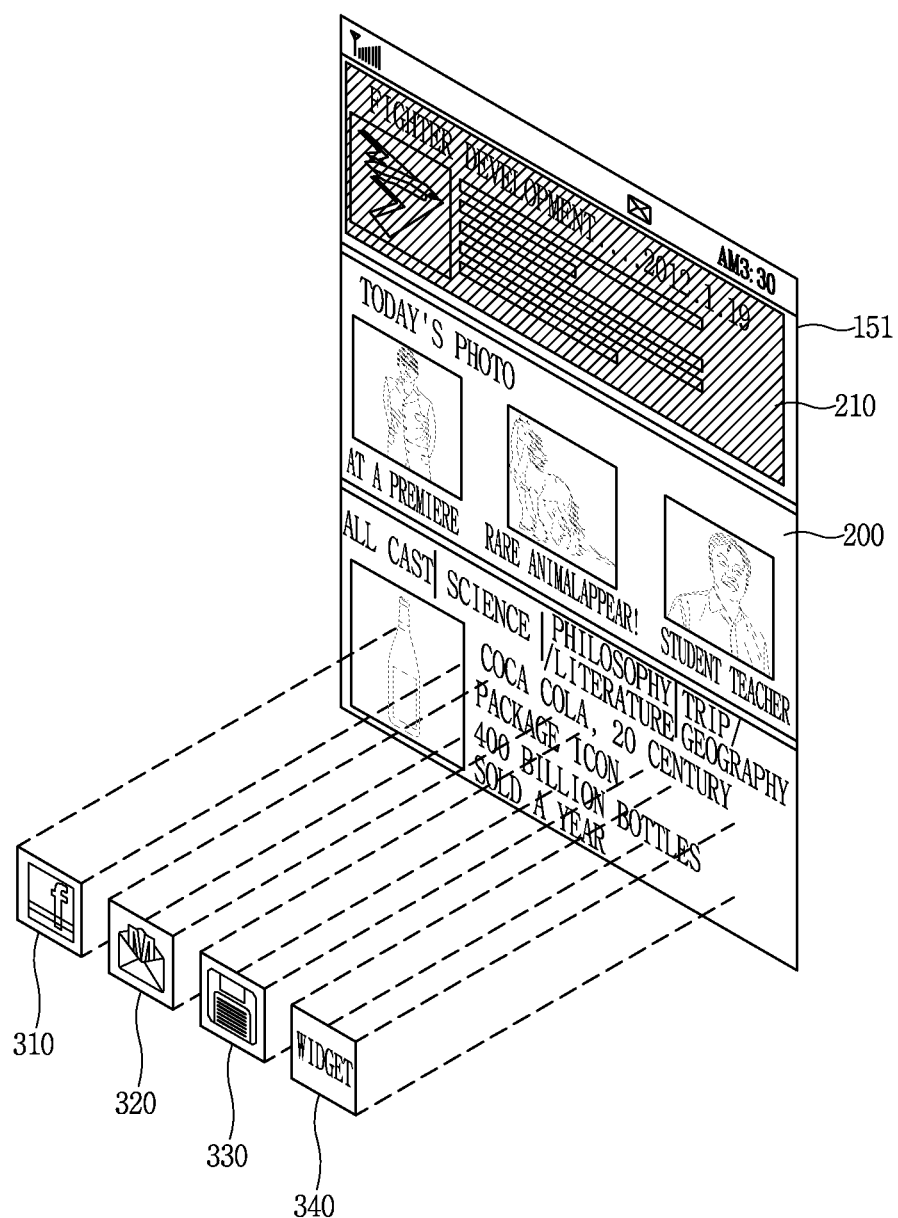

When the selected one area 210 is dragged to one (e.g., 320) of the icons 310, 320, 330, 340 as shown in FIG. 6A-(b), the controller 180, as shown in FIGS. 6A-(c) and 6A-(d), may execute an application corresponding to the icon 320 to which the one area 210 has been dragged, and execute functions associated with the selected one area 210 using the executed application. Therefore, when "selected one area" is dragged to the icon 320 corresponding to a message application, then the controller 180 may transmit an object (an image or an image to which article URL information corresponding to the selected one area is linked), which corresponds to the selected one area 210, to a preset external terminal based on a user selection.

As shown in FIG. 6A-(b), the controller 180 may move the selected one area 210 based on a touch input applied onto the selected one area 210. Here, the controller 180 may move the selected one area 210 along a track of the touch input so as to inform the user of the selected one area being dragged.

Referring to FIG. 6B, the controller 180 may control the display unit 151 such that the icons 310, 320, 330, 340 corresponding to each of at least one application, which is able to execute functions using the selected one area 210, have 3D depth values other than '0'. When the icons 310, 320, 330, 340 are displayed in form of a 3D stereoscopic image, the displayed icons 310, 320, 330, 340 may not overlap information included in the electronic document page. Accordingly, the user may be provided with more information via the display unit 151 with a limited size.

Although not shown, the controller 180 may control the display unit 151 such that the icons 310, 320, 330, 340 can have different 3D depth values based on at least one reference (for example, the recently used function).

Figure 6C:
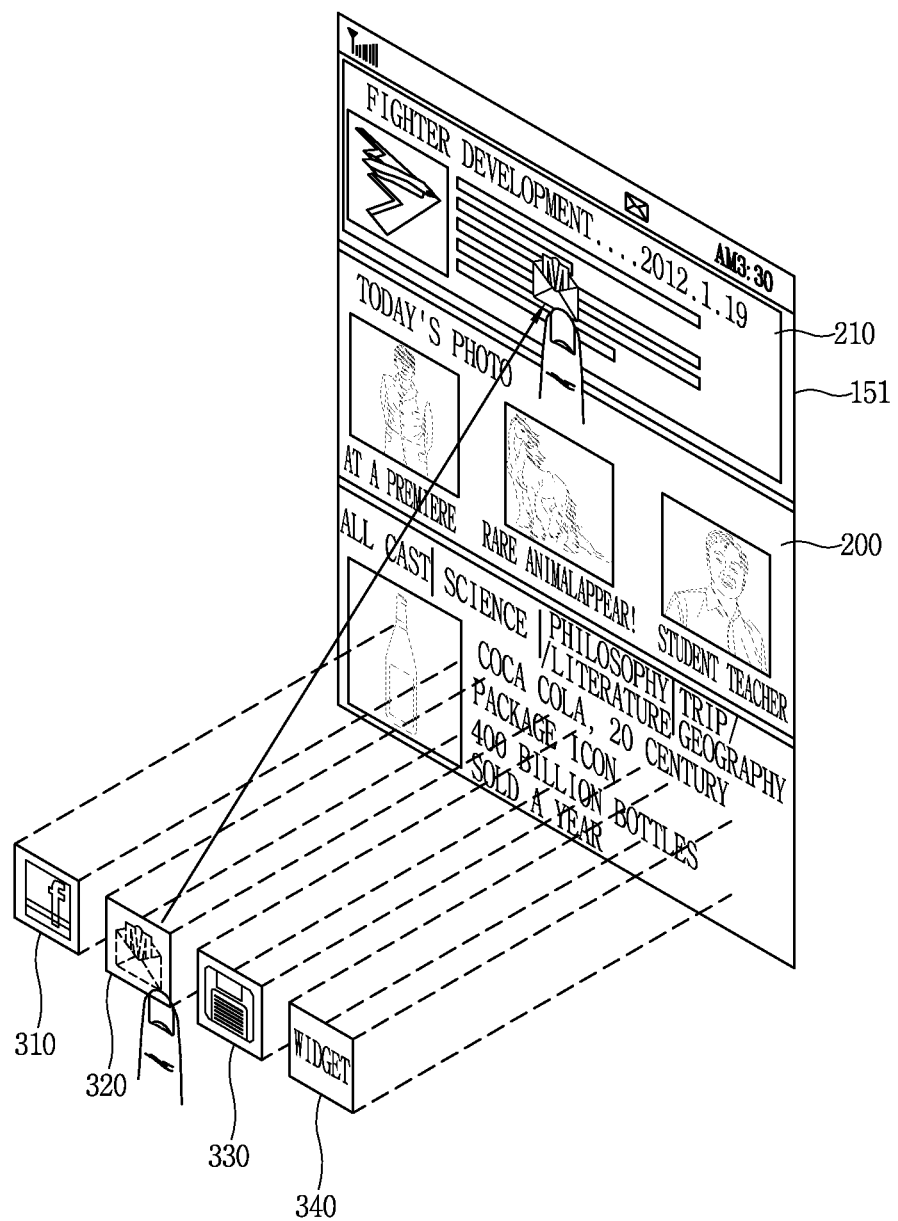

As shown in FIGS. 6B and 6C, as one (e.g., the icon 320) of the icons 310, 320, 330, 340 each output as the 3D stereoscopic image is moved to the selected one area 210, the controller 180 may execute an application corresponding to the moved icon (e.g., 320).

Although not shown, the controller 180 may move the selected one area 210 to one of the icons 310, 320, 330, 340 each displayed as the 3D stereoscopic image based on a user's touch input, and execute an application corresponding to the one icon in response to the selected area 210 being moved to the one icon.

Hereinafter, description will be given of a method of providing an execution screen for a function associated with an object included in one area 210 displayed as a 3D stereoscopic image, in response to a touch input applied onto an electronic document page output on the display unit.

As aforementioned with reference to FIGS. 5A to 5D, the controller 180 may control the display unit 151 to output the selected one area in form of a 3D stereoscopic image based on the user's selection of the one area. In addition, the controller 180 may output an execution screen for an application corresponding to a function associated with the selected one area 210 with continuously displaying the selected one area 210 in the form of the 3D stereoscopic image.

Figure 7A:
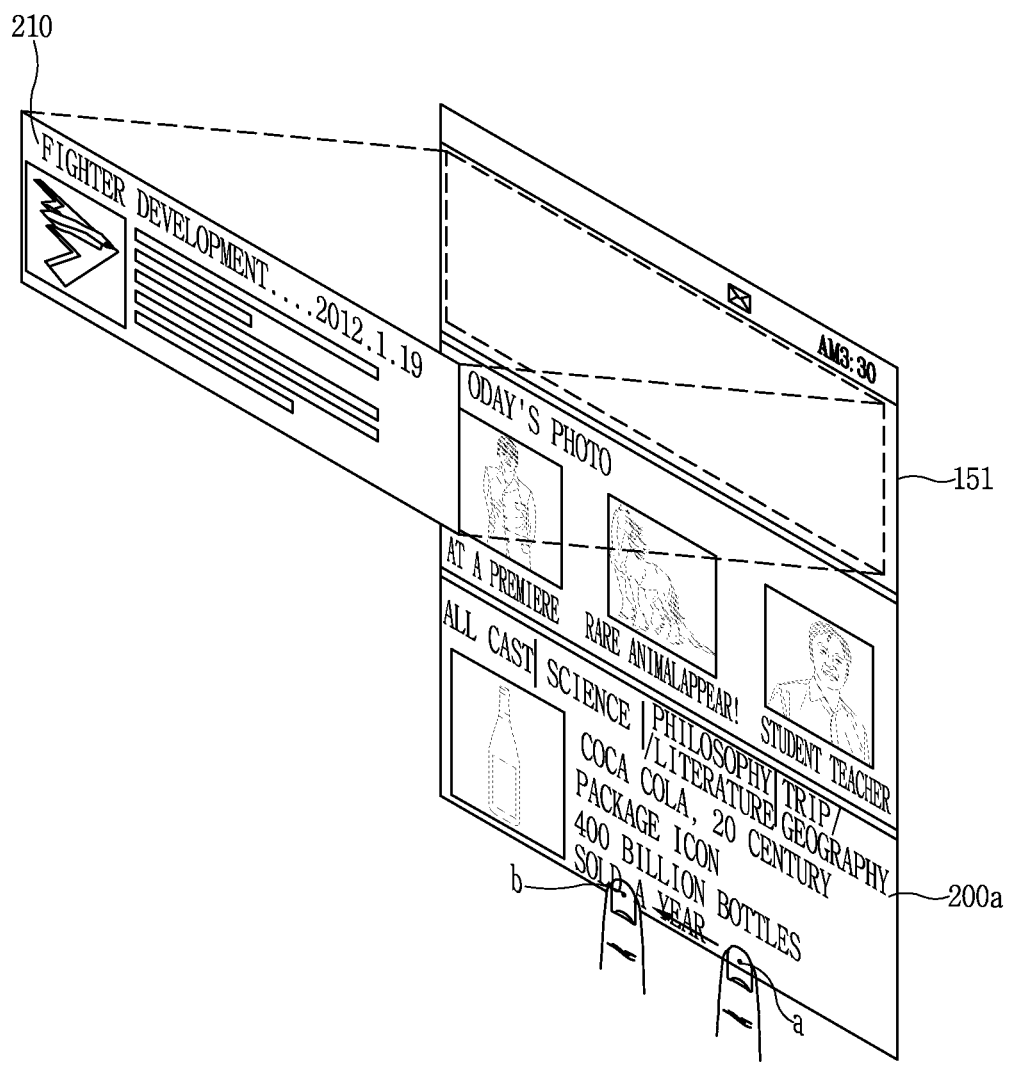
Figure 7B:
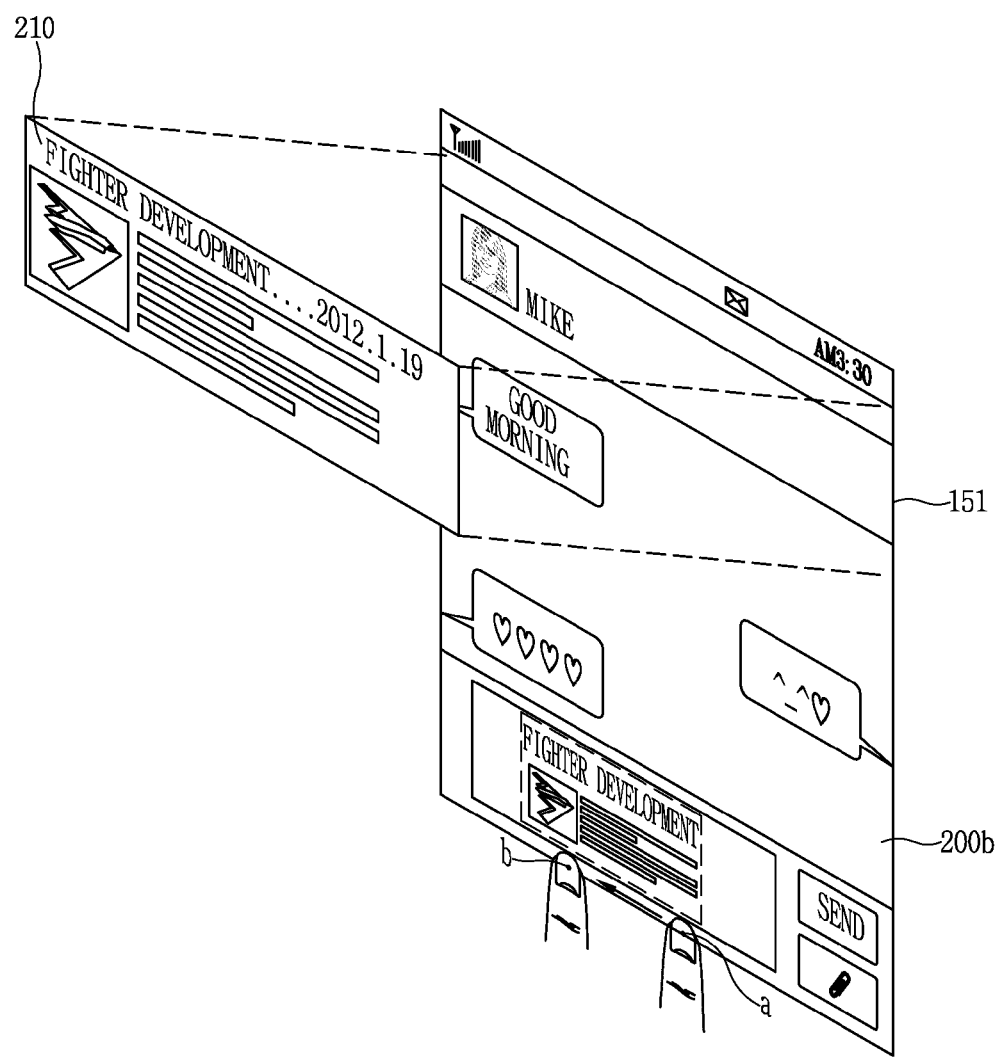
Figure 7C:
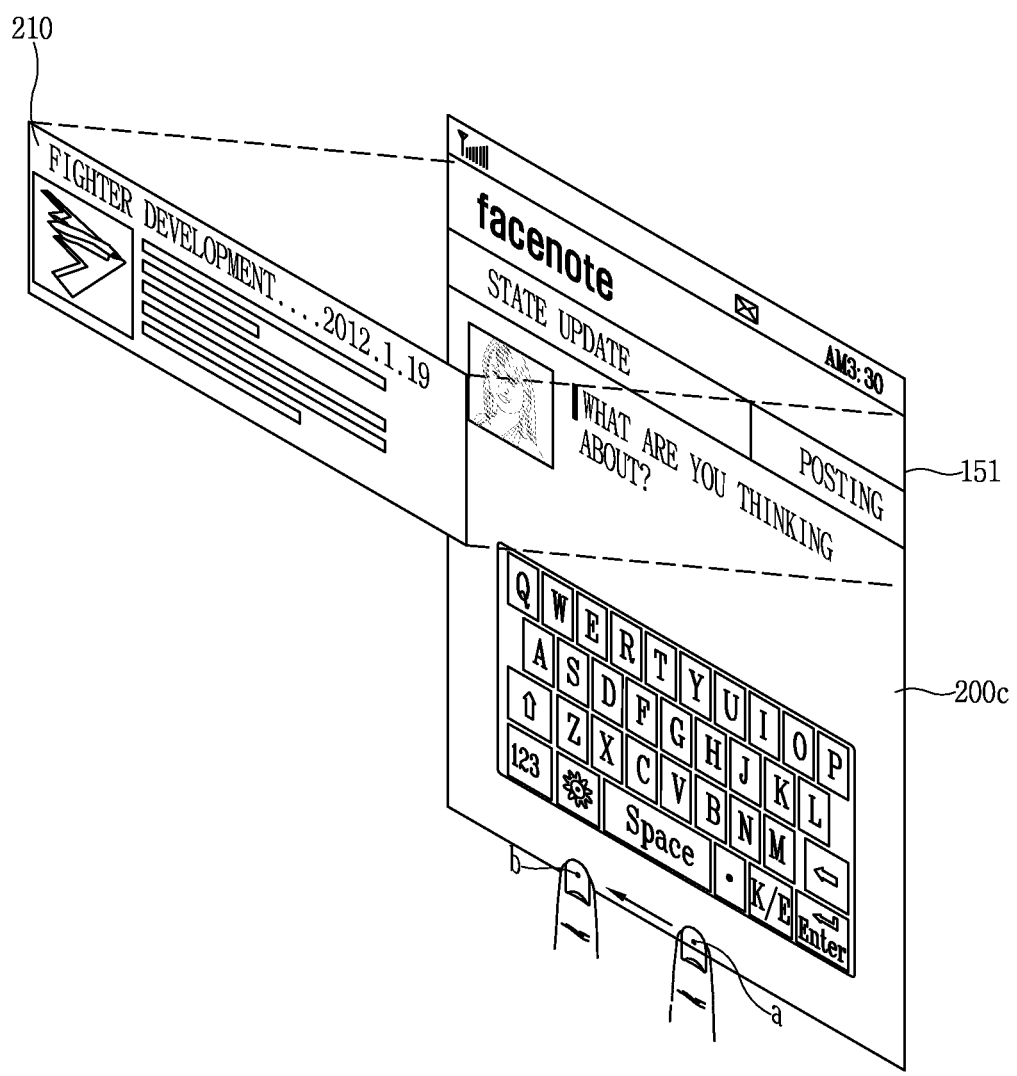
Figure 7D:
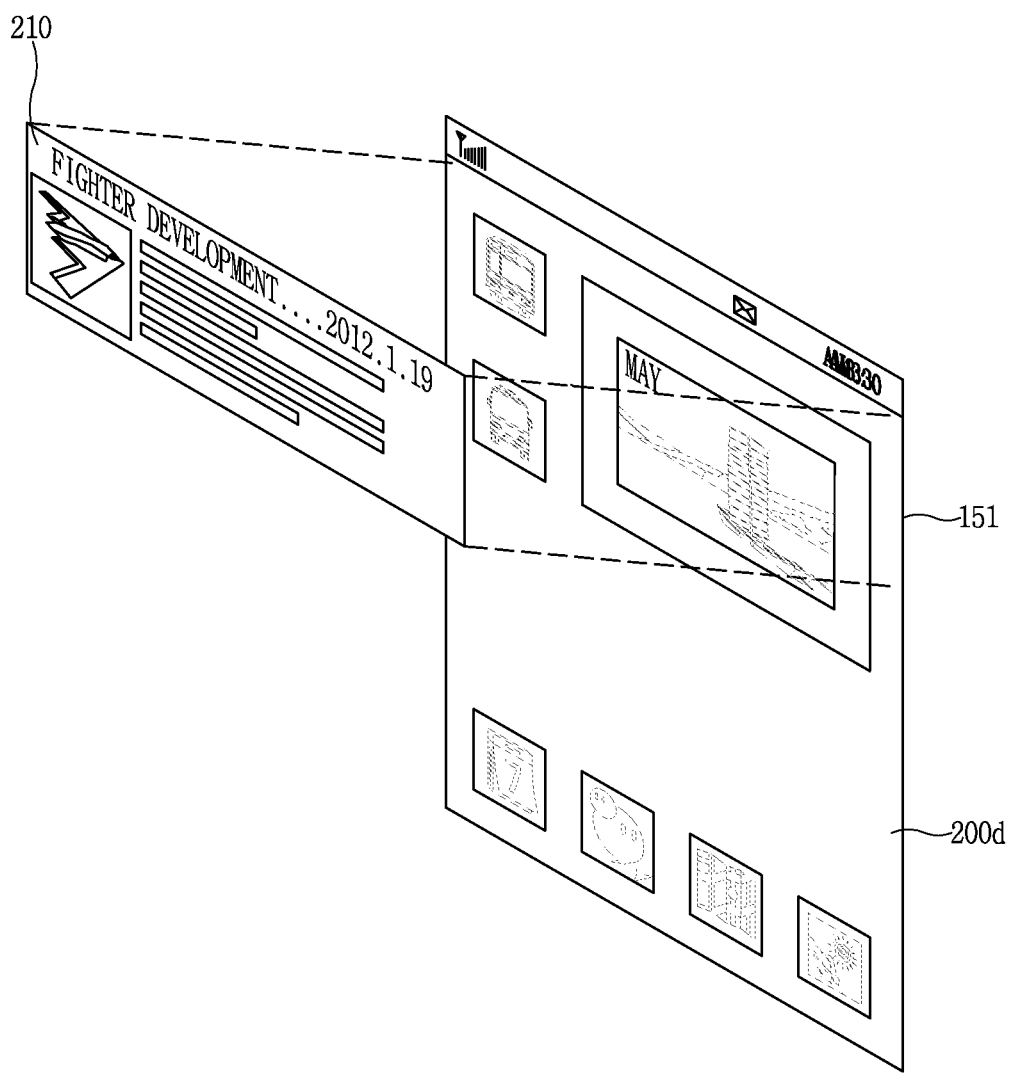

For example, as shown in FIG. 7A, in a state that the selected one area 210 is displayed in the form of the 3D stereoscopic image, when a touch input is applied onto the display unit 151 in one direction (for example, a→b direction), then the controller 180, as shown in FIG. 7B, may output on the display unit 151 an execution screen for one of at least one application corresponding to functions associated with the selected one area 210 with maintaining the displayed state of the selected one area 210. Still referring to FIG. 7B, when the touch input is applied on the display unit 151 in the one direction (for example, a→b direction), the controller 180, as shown in FIG. 7C, may output on the display unit 151 an execution screen for another application, which is different from the application corresponding to the output one execution screen, of the at least one application. Also, referring to FIG. 7C, when the touch input is applied onto the display unit 151 in the one direction (for example, a→b direction), the controller 180, as shown in FIG. 7D, may output on the display unit 151 an execution screen for still another application, which is different from the application corresponding to the one execution screen, of the at least one application.

Thus, the controller 180 may output an execution screen for an application corresponding to a function associated with an object included in the selected one area 210 with maintaining the displayed state of the selected one area 210, thereby reducing a user's burden of separately searching for applications. In the meantime, the user may execute the function of the application corresponding to the execution screen by applying a touch input onto the execution screen output on the display unit. Also, the user may externally transmit the object included in the selected one area 210 or execute the function, for example, an internal memory or the like, which corresponds to the execution screen output on the display unit by way of moving the selected one area 210.

Figure 8A:
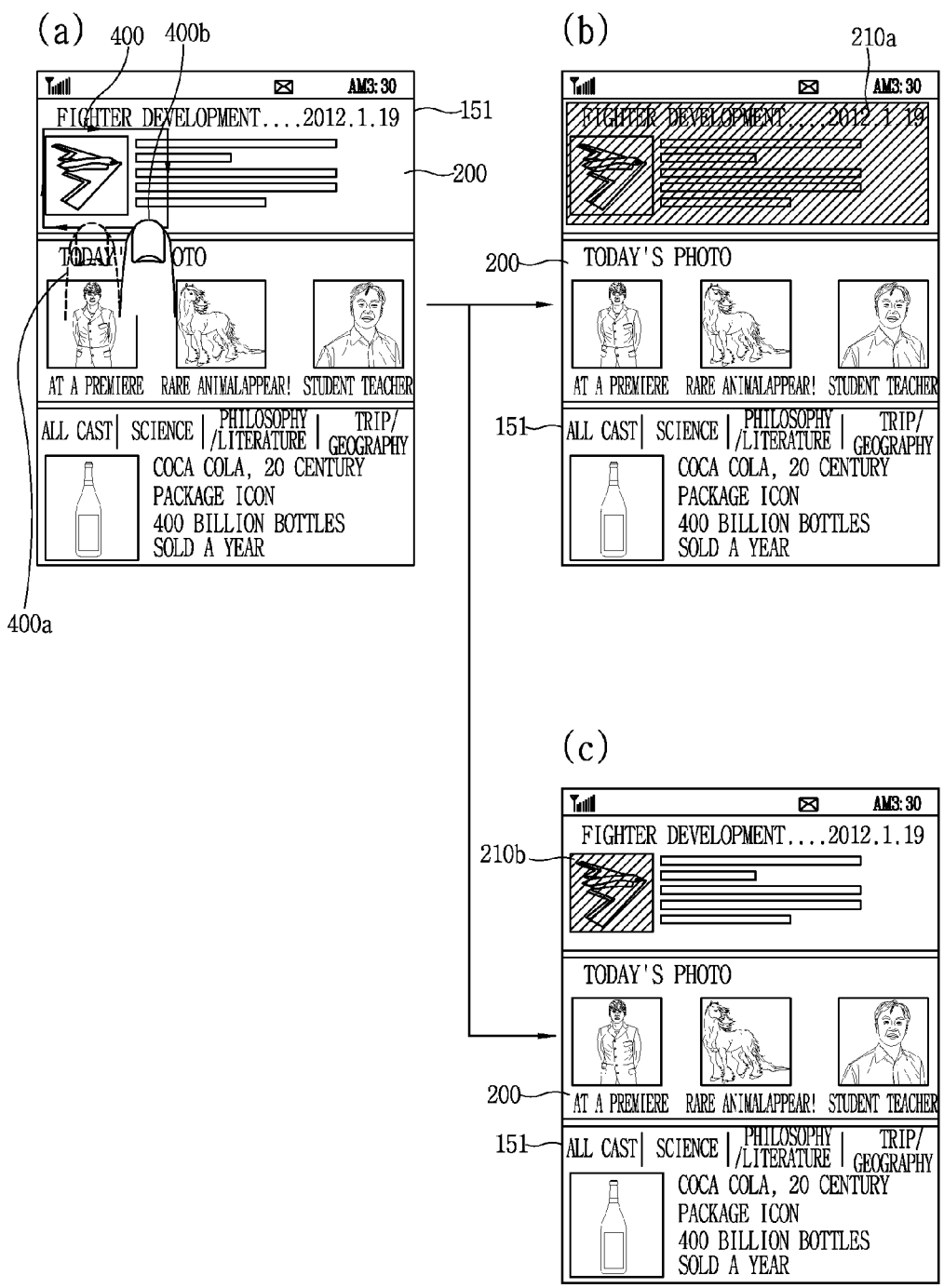
FIGS. 8A to 8C are overviews showing a method of selecting one area in the mobile terminal.
Figure 8B:
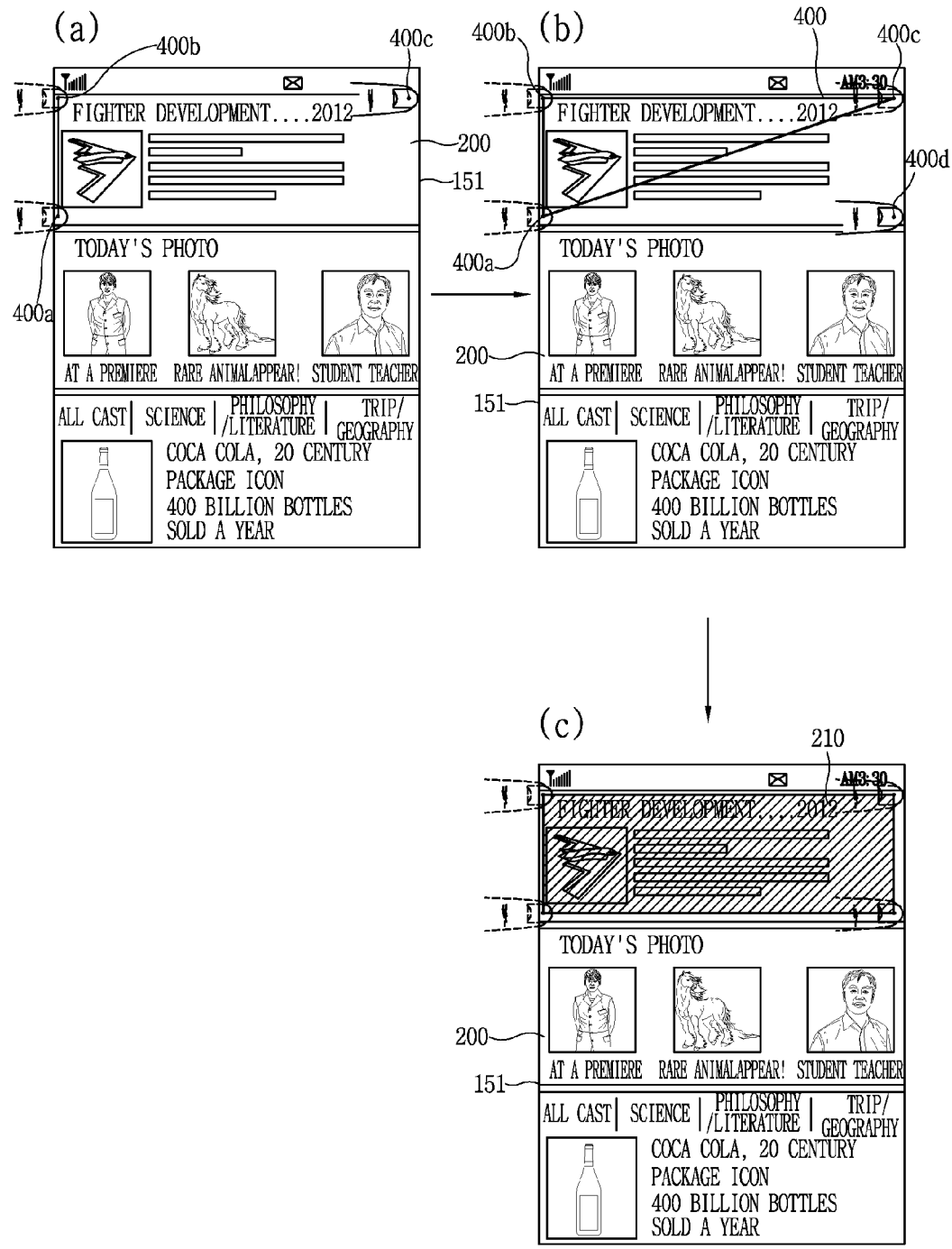
Figure 8C:
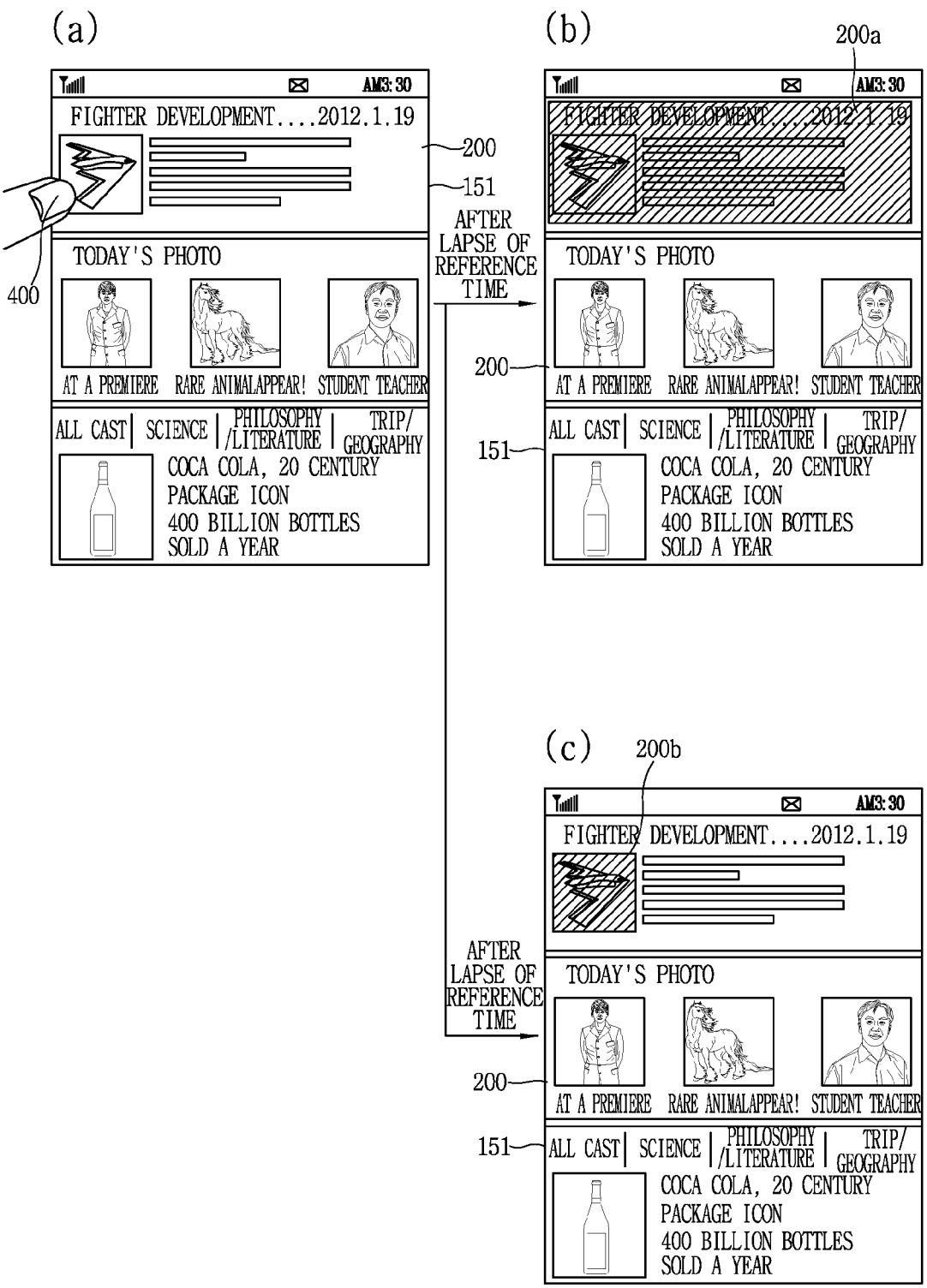

Hereinafter, description will be given of a method of selecting one area in response to a touch input applied onto an electronic document page output on the display unit 151, with reference to the accompanying drawings. FIGS. 8A to 8C are overviews showing a method of selecting one area in the mobile terminal.

As aforementioned with reference to FIGS. 3 and 4, the mobile terminal may be configured to select one area from the electronic document page output on the display unit 151 in response to a touch input applied onto the display unit 151. Also, the touch input for selecting the one area of the electronic document page may be applied in various manners, and the controller 180 may select the one area only when a touch input corresponding to a preset manner is applied.

As one example, in response to a touch input being applied onto the display unit 151, with drawing a loop shape 400, which starts from a first point 400a up to a second point 400b as shown in FIG. 8A-(a), the controller 180 may select one area 210a, 210b as shown in FIG. 8A-(b) and 8A-(c).

When the touch input in the loop shape 400 is applied, the controller 180 may select one area based on a type of object displayed on an area onto which the touch input has been applied, as shown in FIG. 8A-(b). For example, when the object included in the area onto which the touch input in the loop shape 400 is applied is a posting to which URL information is linked, the controller 180 may select every associated object as the one area 210a irrespective of a size of the loop shape 400.

Also, as shown in FIG. 8A-(c), the controller 180 may identify an object included in the touched area as an image, regardless of a type of object displayed on the area where the touch input in the loop shape 400 is applied, and select the area, in which the object included in the area having the touch input in the loop shape 400 applied thereon is displayed, as the one area 210b.

As another example, the controller 180 may select an area, which is formed by touch inputs applied onto at least three points on the display unit 151, as one area. The touch inputs applied onto the at least three points may be a single touch (or tab touch) maintained for a time shorter than a reference time, or a long touch input or a long press touch input maintained for a time more than the reference time.

In the meantime, as shown in FIGS. 8B-(a) and 8B-(c), the controller 180 may display touch-applied points 400a, 400b, 400c and 400d and a virtual area 400 or 210, which is formed by those touch inputs in a highlighting manner so as to be identified by a user.

As another example, the controller 180 may select an area corresponding to a point, to which a preset touch input maintained more than a reference time is applied onto the display unit 151, as one area based on the corresponding touch input.

As shown in FIG. 8C-(a), when a touch input maintained more than a reference time is applied onto one point 400 of an electronic document page 200, the controller 180 may select one area to include objects located on the one point 400.

When the touch input maintained more than the reference time is applied onto the one point 400, as shown in FIG. 8C-(b), the controller 180 may select one area based on a type of object located on the touch-applied point. For example, when an object included in the touch-applied point 400 is a posting having URL information linked thereto, the controller 180 may select every object associated with the object as one area 200*a*.

Referring to FIG. 8C-(c), the controller 180 may recognize an object, which is displayed within the touch-applied point 400, as an image, regardless of a type of object displayed on the touch-applied point 400, and select only an object corresponding to the touch-applied point 400 as one area 200*b*.

Figure 9B:
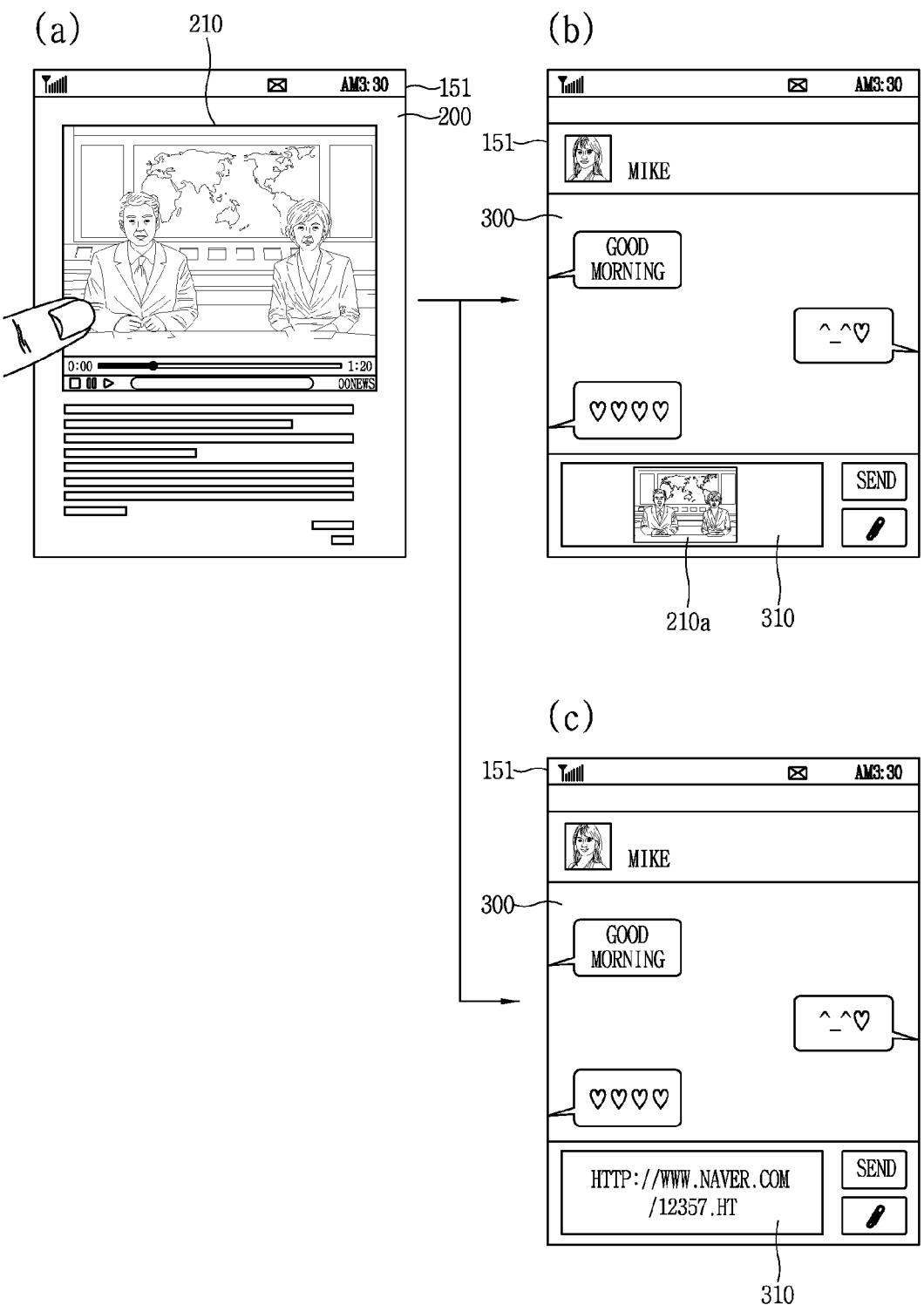

Hereinafter, a method of extracting an object included within a selected one area will be described in more detail with reference to the accompanying drawings. FIGS. 9A and 9B are overviews showing a method of extracting information included in one area in the mobile terminal.

The controller 180 of the mobile terminal according to the present disclosure may recognize an object displayed within a selected one area as it is displayed on the display unit 151.

In this case, the controller 180 may use an object included within a selected one area (210) as shown in FIG. 9A-(a) as a type of image (310) as shown in FIG. 9A-(b). Also, the controller 180, as shown in FIG. 9A-(c), may extract URL information (315) linked to the object included within the one area 210, taking into account an attribute of the object included in the one area 210. The controller 180 may also extract a URL address linked to the object included in the one area 210 with extracting information related to the corresponding object in the image form.

As shown in FIG. 9B-(a), when an object included within the selected one area 210 is a video object, the controller 180 may extract the object included within the one area 210 in the form of an image. Here, when the extracted image 210*a* is selected, the controller 180 may link a URL address so that the video can be reproduced.

As shown in FIG. 9B-(c), the controller 180 may extract URL information linked to the object included within the one area 210. Although not shown, the controller 180 may extract a URL address together with a thumbnail of the video object 210.

As described above, the mobile terminal according to the one exemplary embodiment may be configured so that its controller can extract information corresponding to an object included within one area using a different method according to an attribute of the object.

Figure 10A:
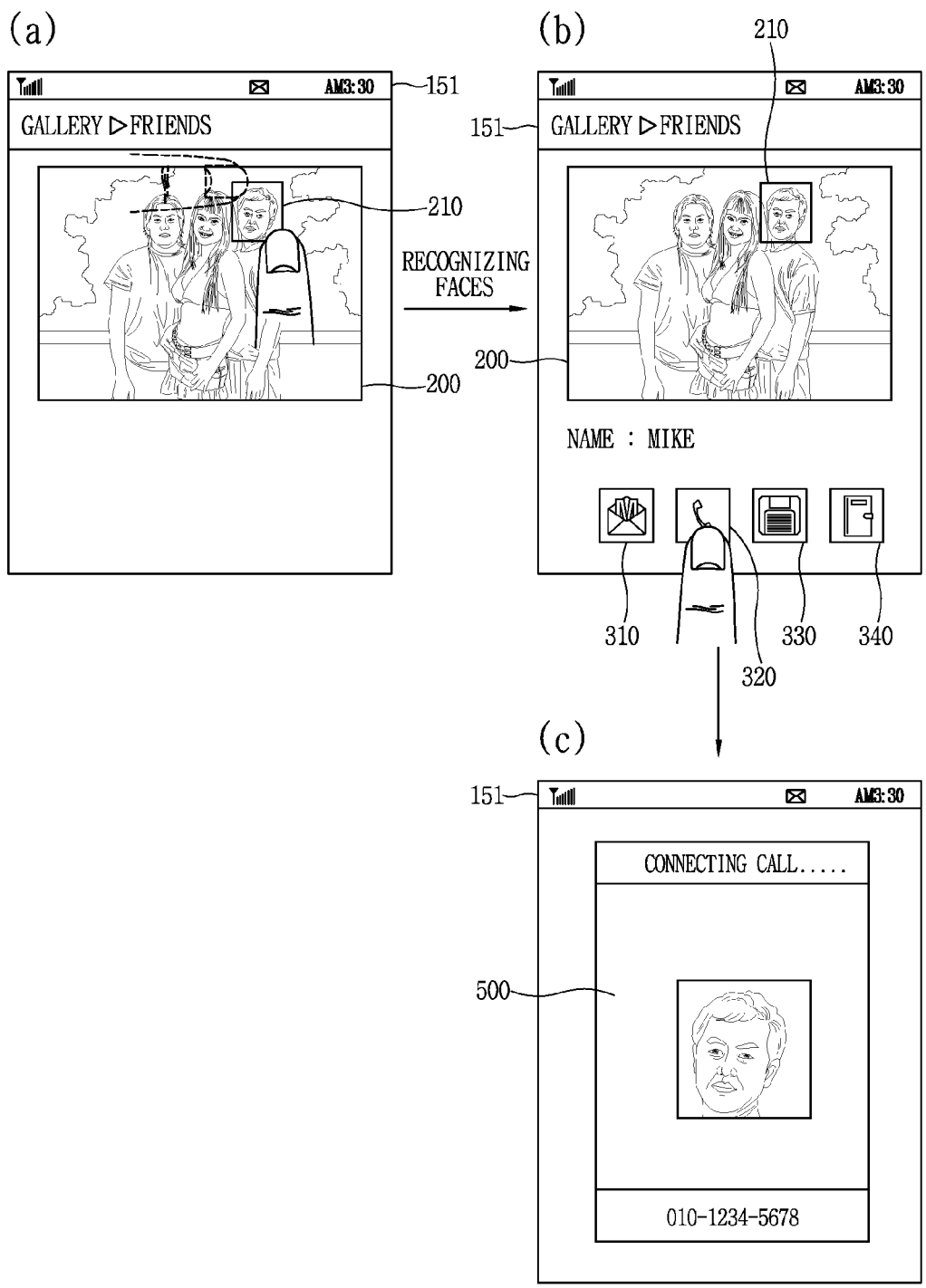

Hereinafter, description will be given in more detail of a function associated with an object included within one area selected by a user in accordance with detailed exemplary embodiments. FIGS. 10A to 10C are overviews showing functions associated with a selected one area in the mobile terminal.

As one example, as shown in FIG. 10A-(a), when a user selects one area, which includes one facial image, as one area 210 from a photo 200 including at least one facial image, the controller 180 may analyze information related to a person corresponding to the facial image using a face recognition algorithm in order to execute functions associated with the object (i.e., the facial image) included in the one area 210.

Then, the controller 180, as shown in FIG. 10A-(b) may output on the display unit 151 information related to the analyzed person and icons 310, 320, 330 and 340, which are associated with functions executable using the person-related information, for example, sending a message, placing a call, saving a photo, and writing a memo.

When the call-placing icon 320 is selected from the plurality of functions (or icons), as shown in FIG. 10A-(c), the controller 180 may originate a call using a phone number stored in correspondence with the facial image 210.

As another example, when the icon 340 corresponding to the memo function is selected as shown in FIG. 10B-(b), the controller 180 may output on the display unit 151 not only an image object included within the selected one area but also an execution screen 500 for a memo application on the display unit 151 to allow for writing a memo.

As another example, as shown in FIGS. 10C-(a) and 10C-(b), the controller 180 may provide a function of editing an object included within the selected one area 210. This may allow a user to edit the object included within the one area 210, for example, deleting an unnecessary portion from the object included within the one area 210 or adjusting a size of the object.

In addition to those exemplary embodiments having described above, the mobile terminal according to the present disclosure may execute functions associated with objects using various applications installed in the terminal.

Figure 11A:
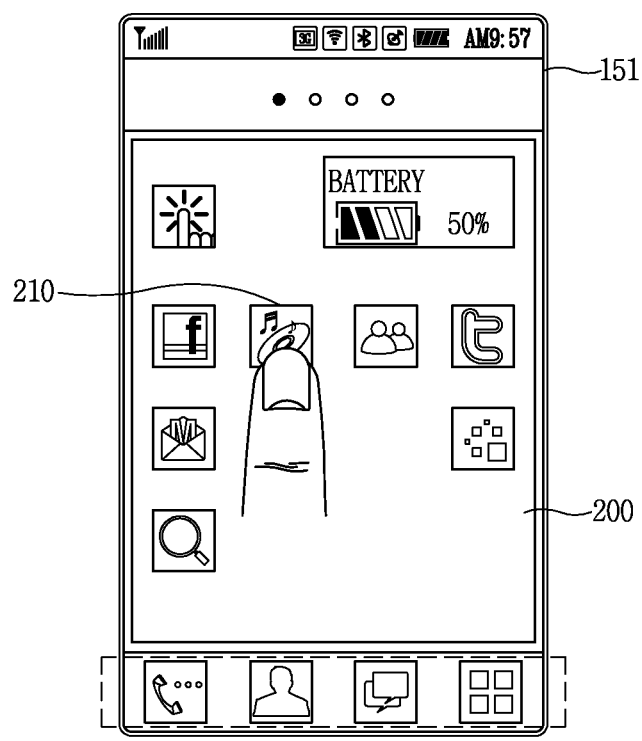
FIGS. 11A and 11B are overviews showing a method of selecting an object from a home screen page in the mobile terminal.
Figure 11B:
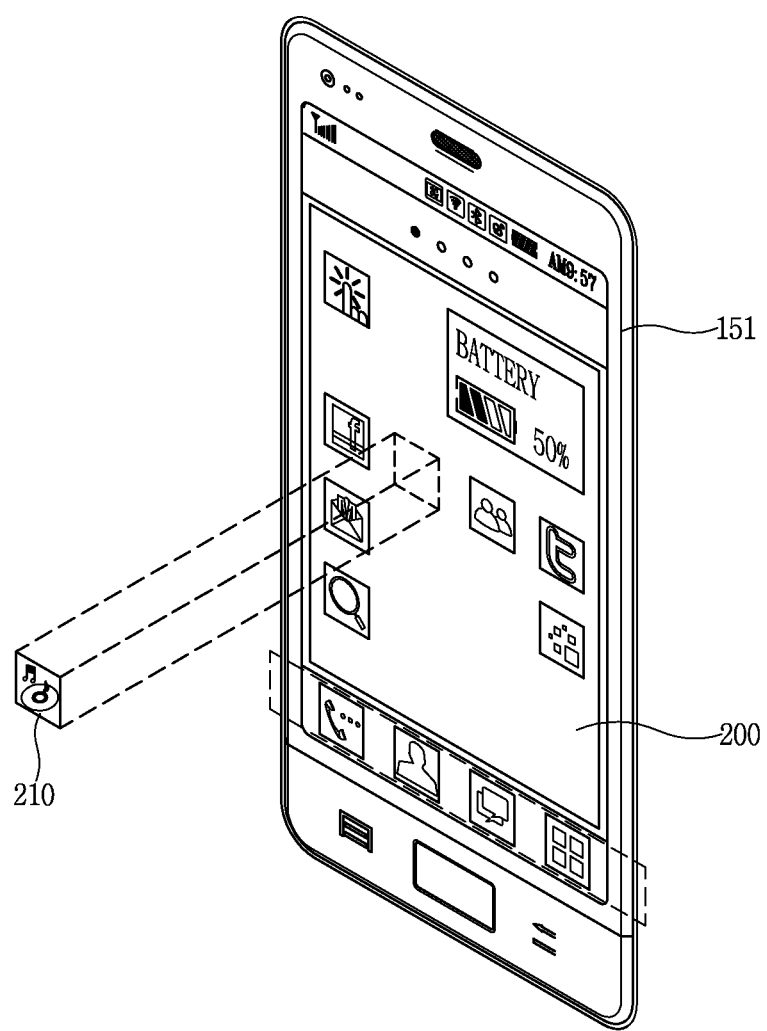
Figure 12A:
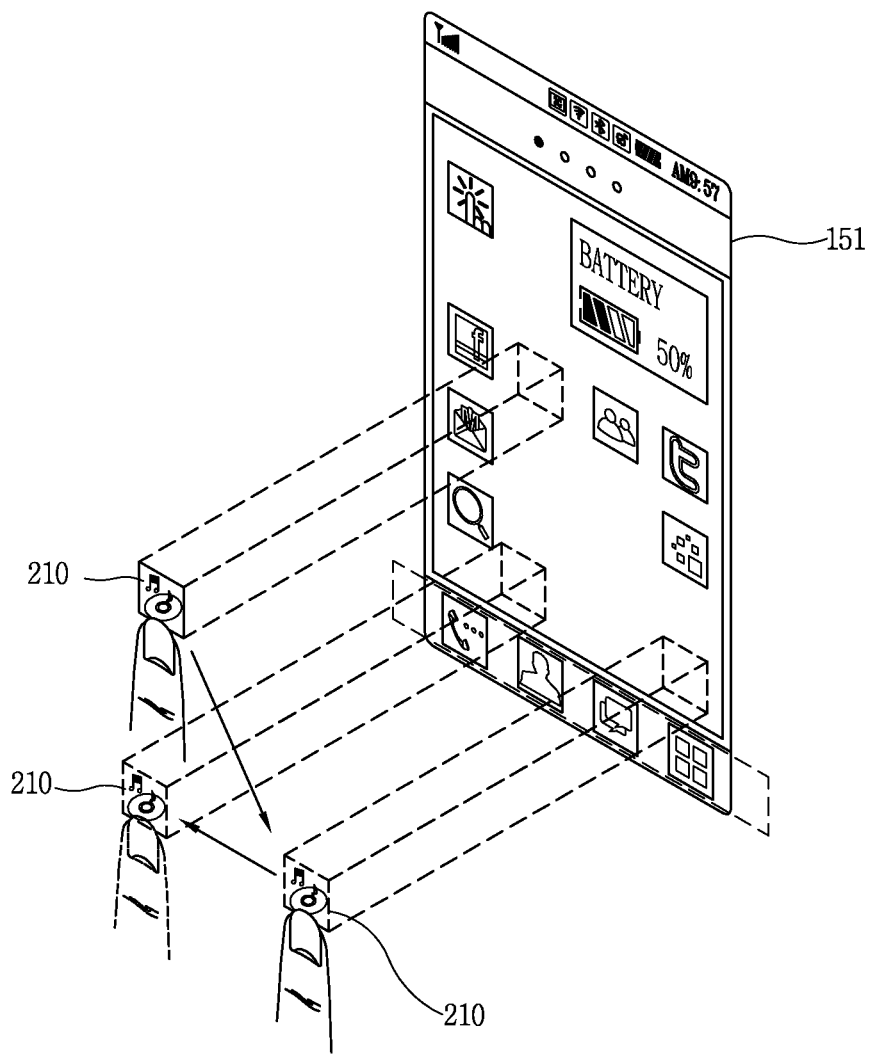

Hereinafter, description will be given of a method of changing an arrangement of an icon or widget, as one of functions associated with the icon or widget when an object included within one area selected by a user is the icon or widget included within a home screen page (or a menu screen). FIGS. 11A and 11B are overviews showing a method of selecting an object from a home screen page in the mobile terminal, FIGS. 12A and 12B are overviews showing a method of moving a selected object and a home screen page in the mobile terminal, and FIGS. 13A to 13C and FIGS. 14A to 14B are overviews showing a method of arranging a selected object in the mobile terminal.

As shown in FIG. 11A, the controller 180 (see FIG. 1) of the mobile terminal according to the one exemplary embodiment may output an idle screen, a home screen page or a menu screen on the display unit 151. The idle screen, the home screen page or the menu screen may include at least one object, and the object may be an icon or widget of an application installed in the mobile terminal.

The idle screen, the home screen page or the menu screen may be configured to include a plurality of pages according to a user's selection or the number of applications installed in the terminal.

Hereinafter, a home screen page 200 will be exemplarily described.

Referring to FIG. 11A, when one object 210 of at least one object output on the home screen page 200, the controller 180, as shown in FIG. 11B, may control the display unit 151 so that a 3D depth value of the selected object can have a value other than '0', in order to display the selected object 210 in the form of a 3D stereoscopic image. As such, the controller 180 may display the selected object 210 as the 3D stereoscopic image, allowing the user to intuitively identify the selected object 210.

Also, the controller 180 may execute an edit mode for changing position information related to the selected object 210 in response to a first touch input for selecting the object 210. Upon execution of the edit mode, the controller 180, as shown in FIG. 12A, may move the selected object 210 to a specific area on the display unit 151 based on a user's touch input.

In the meantime, the controller 180 may convert the currently output home screen page into another home screen page based on a user selection in the edit mode. Here, the controller 180 may not move the selected object 210 to arrange on the another home screen page.

That is, as shown in FIGS. 12B-(a) and 12B-(b), even though a first home screen page 200*a* is converted into a second home screen page 200*b* in response to a touch input being applied for the conversion, the selected object 210 may continuously be output on the display unit 151.

Although not shown, the user may change a position where the selected object 210 is arranged by moving the selected object 210 displayed in the form of a 3D stereoscopic image to a desired position on the home screen pages 200*a* and 200*b* using a touch input.

When the selected object 210 is moved to the home screen page 200*a*, 200*b*, a 3D depth value of the selected object 210 may gradually be converged on '0'. Also, at the moment that the 3D depth value of the selected object 210 becomes '0', the controller 180 may decide an area where the selected object 210 is located as a position to arrange the selected object 210, and terminate the edit mode.

Figure 13A:
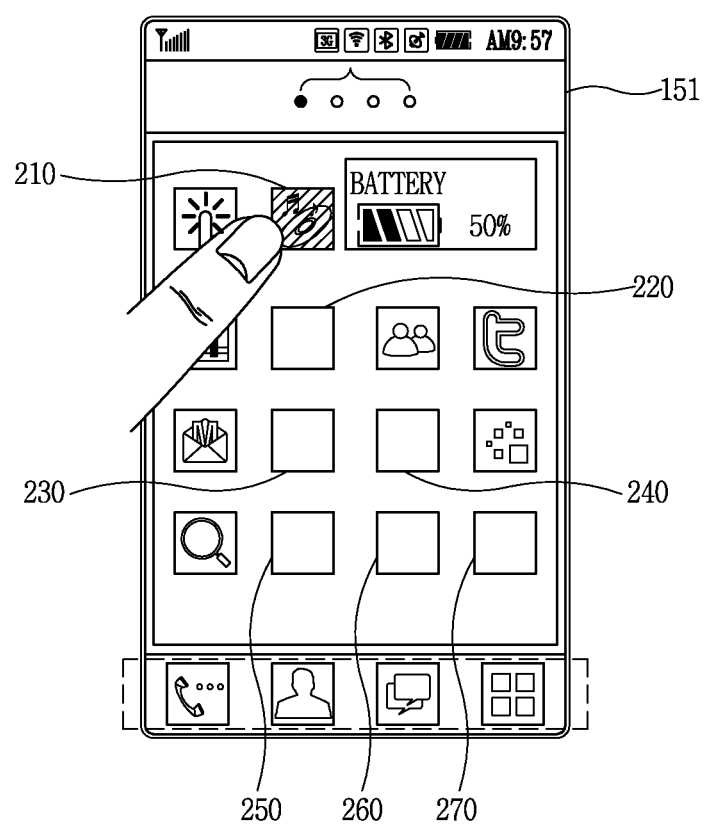
FIGS. 13A to 13C and FIGS. 14A to 14B are overviews showing a method of arranging a selected object in the mobile terminal.
Figure 13B:
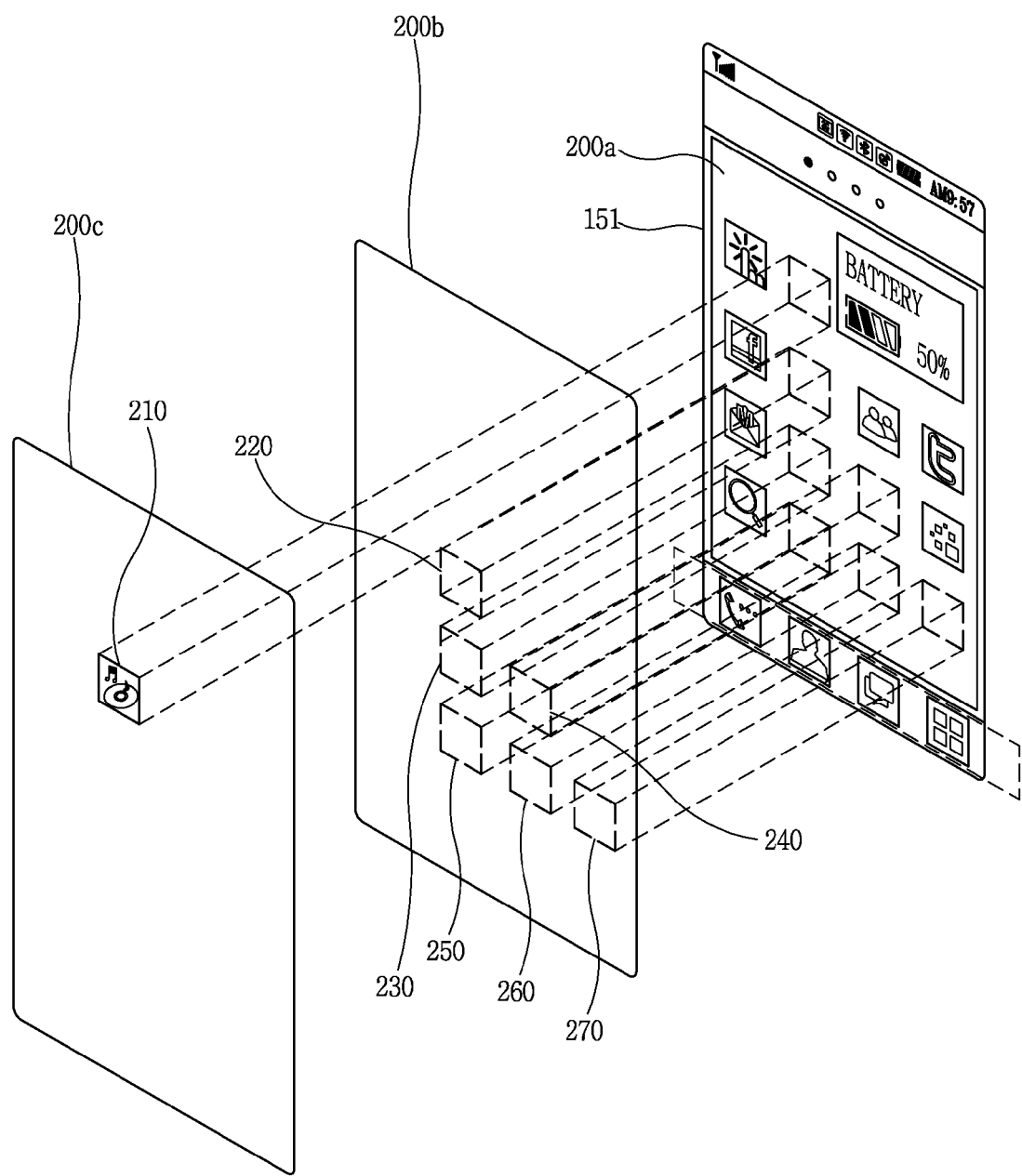

As shown in FIGS. 13A and 13B, the controller 180 may control the display unit 151 so that both the user-selected object 210 and at least one area 220, 230, 240, 250, 260, 270 where the selected object 210 is to be arranged can be displayed as 3D stereoscopic images. Also, the controller 180 may control the selected object 210 and the at least one area 220, 230, 240, 250, 260, 270 where the selected object 210 is to be arranged to have different 3D depth values from each other. This may allow the user to intuitively identify the area where the selected object 210 can be arranged.

Figure 13C:
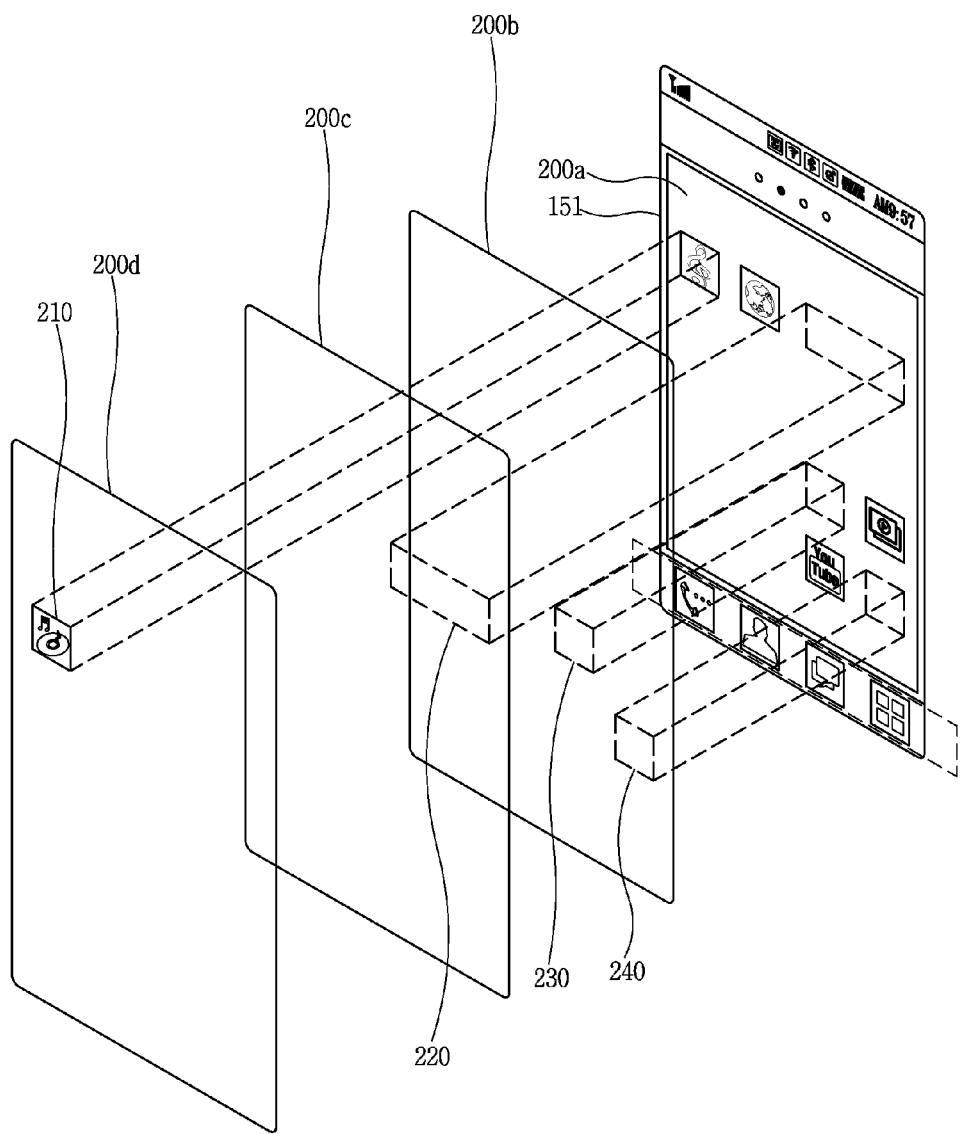

As shown in FIG. 13C, the controller 180 may output information related to areas 220, 230 and 240 adjacent to the area, in which an object corresponding to an application associated with the selected object 210 is located, among areas where the selected object 210 can be arranged, in the form of the 3D stereoscopic image. In addition, the controller 180 may control the display unit 151 so that a 3D depth value of the area 220, which is adjacent to an application having a high association with an application corresponding to the selected object 210 can be greater.

That is, the controller 180 may decide priorities based on an area with a high association with the selected object 210, and control the display unit 151 so that those areas can have different 3D depth values according to the decided priorities.

In the meantime, the controller 180 may allow the user to select an area to arrange the selected object 210, or decide a position to arrange the selected object on the basis that the selected object 210 is moved onto the area.

Figure 14A:
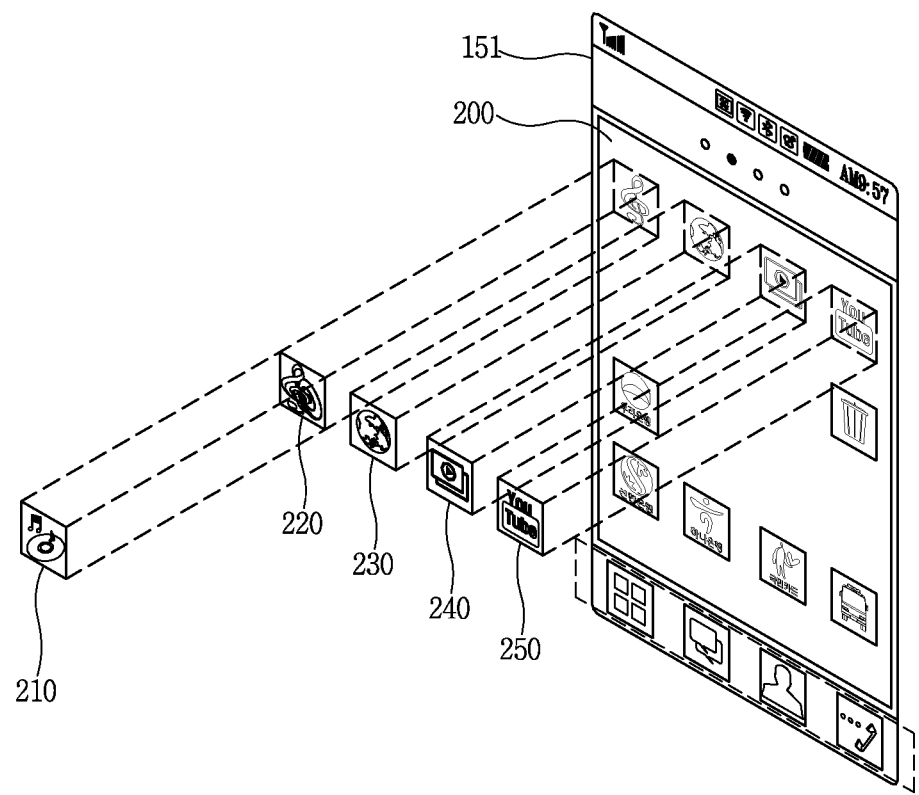
Figure 14B:
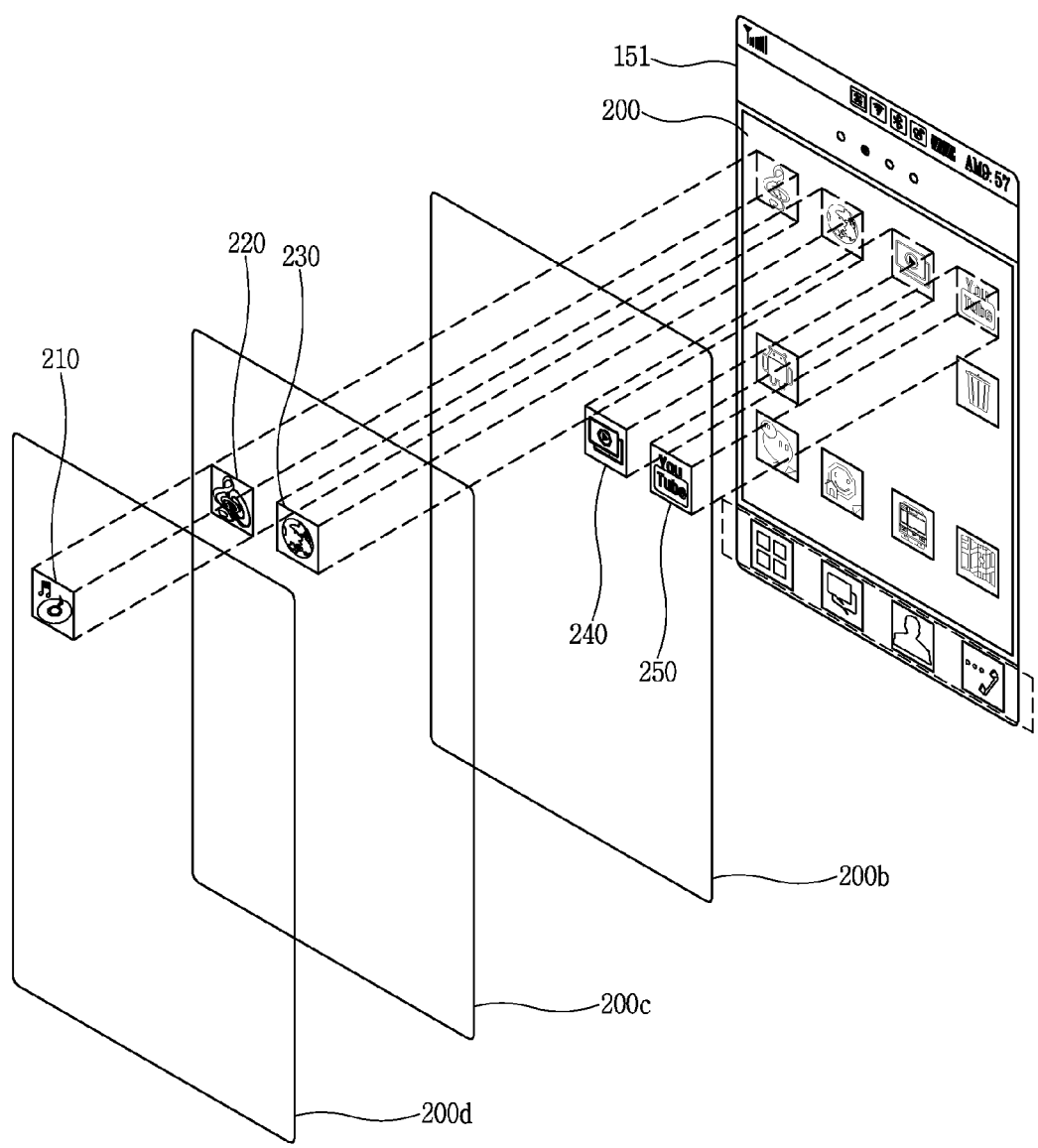

As shown in FIG. 14A, the controller 180 may display objects 220, 230, 240 and 250, which correspond to applications associated with an application corresponding to the selected object 210, in the form of the 3D stereoscopic image. Also, as shown in FIG. 14B, the controller 180 may control the objects to have different 3D depth values according to a degree of association.

As described above, a mobile terminal according to the present disclosure may be configured to display an object to be moved and an area on which the object is to be arranged in the form of 3D stereoscopic image in order to change a position of the object, resulting in providing a user with intuitive visual information for changing the position of the object.

Also, in accordance with a mobile terminal and a control method thereof according to the one exemplary embodiment, a specific area selected by a user on an electronic document page may be displayed to be distinguishable from the other area, providing the user with information related to the selected area. When the user selects the specific area, function information for executing associated functions using information included in the selected specific area may be searched for. This may result in reduction of burden that the user has to directly search for applications to execute the functions associated with information included in the selected specific area.

In addition, in accordance with a mobile terminal and a control method thereof according to the one exemplary embodiment, an edit mode for changing a position of an object, which corresponds to an application, may be executed using a touch input applied onto the object, and a home screen page output on a display unit may change using a touch input applied onto the home screen page in the edit mode. This may allow the user to search for a home screen page to arrange the object thereon, regardless of moving the object, without searching for the home screen page for arranging the object by moving the object.

Furthermore, in accordance with a mobile terminal and a control method thereof according to the one exemplary embodiment, an object to be moved may be output in the form of 3D image, providing a user with information related to the object to be moved.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen configured to display an electronic document page; and
a controller operably coupled with the touch screen and configured to:
select an area of the displayed electronic document page in response to a first touch input applied to the touch screen, wherein the selected area comprises an object;
cause the touch screen to display the selected area in a first three-dimensional (3D) depth value and at least one icon representing at least one function executable using the object in a second 3D depth value in response to the first touch input, wherein each of the first 3D depth value and the second 3D depth value is a numeric value other than zero and the second 3D depth value is different from the first 3D depth value; and cause the touch screen to display a first execution screen corresponding to a function executed using the object in place of the electronic document page in response to a second touch input triggering the execution of the function while the selected area is displayed in the first 3D depth value.

2. The terminal of claim 1, wherein the controller is further configured to cause the touch screen to replace the first execution screen with a second execution screen corresponding to another of the at least one function associated with the selected area in response to a third touch input applied to the touch screen while the selected area is displayed in the first 3D depth value.

3. The terminal of claim 1, wherein the second touch input comprises a dynamic gesture dragging the object into an icon representing the function.

4. The terminal of claim 1, wherein the controller is further configured to at least copy or save the object in response to a user selection.

5. The terminal of claim 1, wherein the first touch input comprises touching at least three points on the touch screen and the controller is further configured to:
    select the area formed by the at the least three points; and
    cause the touch screen to display the at least three points and a virtual area corresponding to the at least three points such that the at least three points and the virtual area are distinguishable from other areas of the displayed electronic document page.

6. A method of displaying information in a mobile terminal, the method comprising:
    displaying an electronic document page on a touch screen;
    selecting an area of the displayed electronic document page in response to a first touch input applied to the touch screen, wherein the selected area comprises an object;
    displaying the selected area in a first three-dimensional (3D) depth value and at least one icon representing at least one function executable using the object in a second 3D depth value in response to the first touch input, wherein each of the first 3D depth value and the second 3D depth value is a numeric value other than zero and the second 3D depth value is different from the first 3D depth value; and
    displaying an execution screen corresponding to a function executed using the object in place of the electronic document page in response to a second touch input triggering the execution of the function while the selected area is displayed in the first 3D depth value.

7. The method of claim 6, wherein the second touch input comprises a dynamic gesture dragging the object into an icon representing the function.

8. The method of claim 6, further comprising at least copying or saving the object in response to a user selection.

9. The method of claim 6, wherein the first touch input comprises touching at least three points on the touch screen and the method further comprises:
    selecting the area formed by the at the least three points; and
    displaying the at least three points and a virtual area corresponding to the at least three points such that the at least three points and the virtual area are distinguishable from other areas of the displayed electronic document page.

\* \* \* \* \*